(12) United States Patent
Liu et al.

(10) Patent No.: US 9,971,330 B2
(45) Date of Patent: *May 15, 2018

(54) SAFETY RELAY CONFIGURATION EDITOR

(71) Applicant: Rockwell Automation Technologies, Inc., Mayfield Heights, OH (US)

(72) Inventors: Zhixuan Liu, Dalian (CN); Bradley A. Prosak, Bedford, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 551 days.

This patent is subject to a terminal disclaimer.

(21) Appl. No.: 14/640,564

(22) Filed: Mar. 6, 2015

(65) Prior Publication Data

US 2016/0259313 A1 Sep. 8, 2016

(51) Int. Cl.
*G05B 19/042* (2006.01)
*G05B 23/02* (2006.01)
(Continued)

(52) U.S. Cl.
CPC ..... *G05B 19/0428* (2013.01); *G05B 23/0216* (2013.01); *G06F 3/0484* (2013.01); *G06F 8/34* (2013.01); *G05B 2219/24024* (2013.01)

(58) Field of Classification Search
CPC ...... G05B 19/0428; G05B 2219/24024; G05B 23/0216; G06F 3/0484; G06F 8/34
See application file for complete search history.

(56) References Cited

U.S. PATENT DOCUMENTS 9,361,073 B2 * 6/2016 Prosak ............... G06F 8/34
2007/0093917 A1 4/2007 Steinman
(Continued)

FOREIGN PATENT DOCUMENTS

| CN | 101482736 | 7/2009 |
|---|---|---|
| CN | 104750063 | 7/2015 |
| EP | 2763062 | 8/2014 |

OTHER PUBLICATIONS

Extended European Search Report for EP Patent Application Serial No. 16158517.9, dated Jun. 30, 2016, 7 pages.
(Continued)

*Primary Examiner* — Abdelmoniem Elamin
(74) *Attorney, Agent, or Firm* — Amin, Turocy & Watson, LLP

(57) ABSTRACT

A safety relay configuration system for configuring safety functions to be carried out by a safety relay is provided. The configuration system comprises a number of features that facilitate intuitive and simplified configuration of an industrial safety relay, including but not limited to features that guide the user through the configuration process using an intuitive sequential procedure, enforce design consistency throughout the configuration project by intelligently limiting user selections, and visually organize configuration and status information in a manner that efficiently utilizes display space and allows the user to quickly evaluate available configuration options. The configuration system organizes function blocks into columns according to function block type and uses pass-through blocks and signal flow line drawing rules to yield an organized program visualization that can be easily followed and interpreted.

20 Claims, 24 Drawing Sheets

(51) Int. Cl.
*G06F 3/0484* (2013.01)
*G06F 9/44* (2018.01)

(56) References Cited

U.S. PATENT DOCUMENTS

| | | |
|---|---|---|
| 2010/0205418 A1 | 8/2010 | Kishan |
| 2015/0045911 A1* | 2/2015 | Sakamoto .......... G05B 19/0428 700/11 |
| 2015/0185710 A1* | 7/2015 | Prosak .................... G05B 9/02 700/79 |
| 2015/0187524 A1* | 7/2015 | Prosak .................. H01H 50/00 361/160 |

OTHER PUBLICATIONS

EP Office Action for EP Patent Application No. 16158517.9, dated Mar. 24, 2017, 6 pages.
Extron: "User Guide DMP 64 Digital Matrix Processor", Apr. 30, 2013, pp. 1-146, XP055356024, Retrieved from the Internet on Mar. 17, 2017: URL:http://media.extron.comldownload/filesluserman/68/1790-01_C_DMP64_pdf.
European Office Action for EP Patent Application Serial No. 16158517.9, dated Sep. 12, 2016, 2 pages.

* cited by examiner

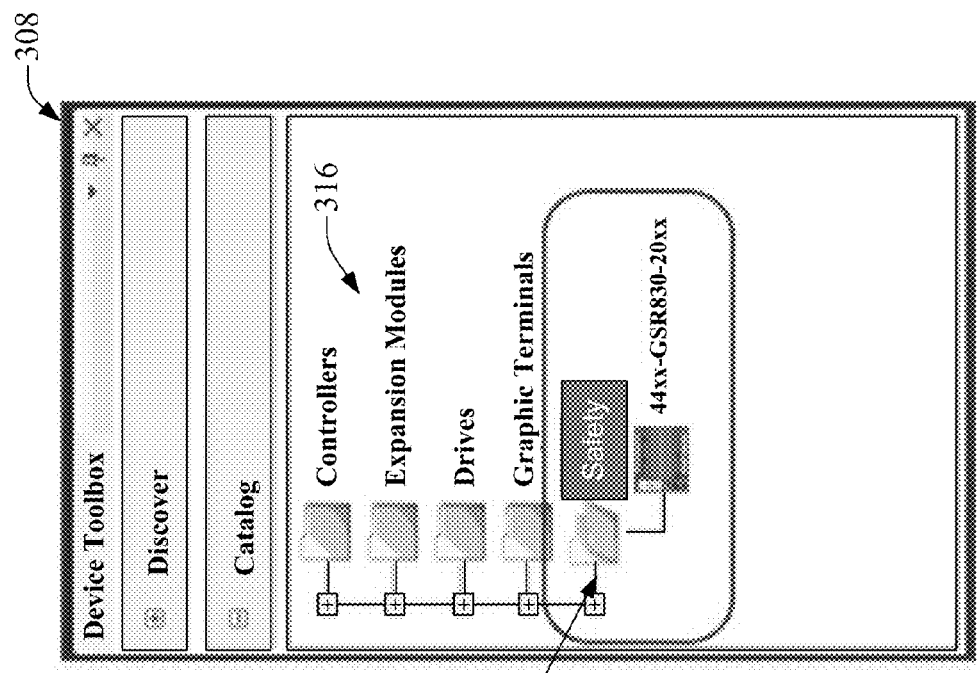
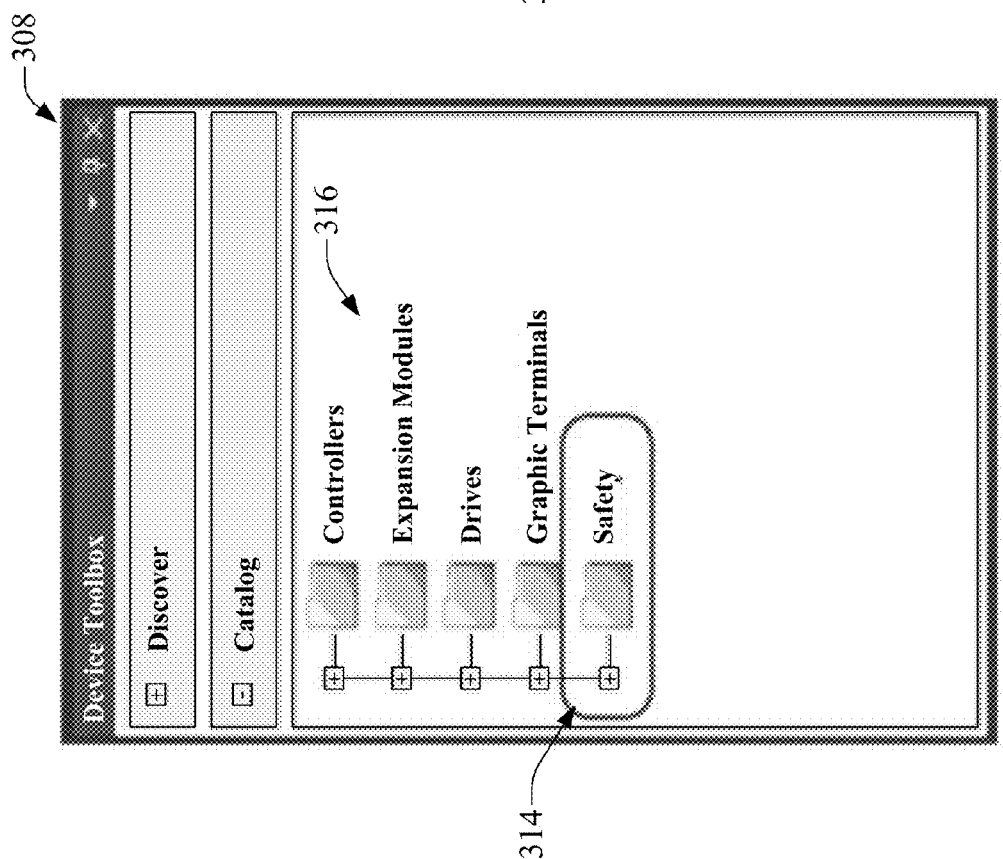
FIG. 5b
FIG. 5a

SAFETY RELAY CONFIGURATION EDITOR

BACKGROUND

The subject matter disclosed herein relates generally to configuration systems and graphical interfaces for configuration and monitoring of an industrial safety relay

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for programming an industrial safety relay is provided, comprising a configuration component configured to create a configuration program for a safety relay based on configuration input that manipulates graphical function blocks and signal flow lines between the graphical function blocks; and a graphical interface component configured to receive the configuration input and to display the graphical function blocks on an editing area of a configuration interface, wherein the graphical interface component is configured to organize the graphical function blocks into four columns of the editing area, and wherein the four columns are classified according to function block type.

Also, according to one or more embodiments, a non-transitory computer-readable medium is provided having stored thereon instructions that, in response to execution, cause a system to perform operations, the operations comprising displaying graphical function blocks on an editing area of a configuration interface, wherein the displaying comprises arranging the graphical function blocks into four columns according to function block type; receiving configuration input via manipulation of one or more of the graphical function blocks and signal flow lines between the graphical function blocks; and generating a configuration program for a safety relay based on the configuration input.

Also, one or more embodiments provide a method for constructing a program for an industrial safety relay, comprising adding, by a system comprising at least one processor, graphical function blocks to an editing area of a configuration interface in response to first configuration input, wherein the adding comprises aligning the graphical function blocks into four columns classified according to function block type; adding, by the system, signal flow lines between at least a subset of the graphical function blocks in response to receipt of second configuration input, wherein the signal flow lines programmatically associate the subset of the graphical function blocks; and creating, by the system, a configuration program for a safety relay based on the graphical function blocks and the signal flow lines.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 5a is an example screen layout for the device toolbox area of the safety relay configuration system.

FIG. 5b is an example screen layout for the device toolbox area of the safety relay configuration system illustrating expansion of a device folder.

DETAILED DESCRIPTION

Figure 1:
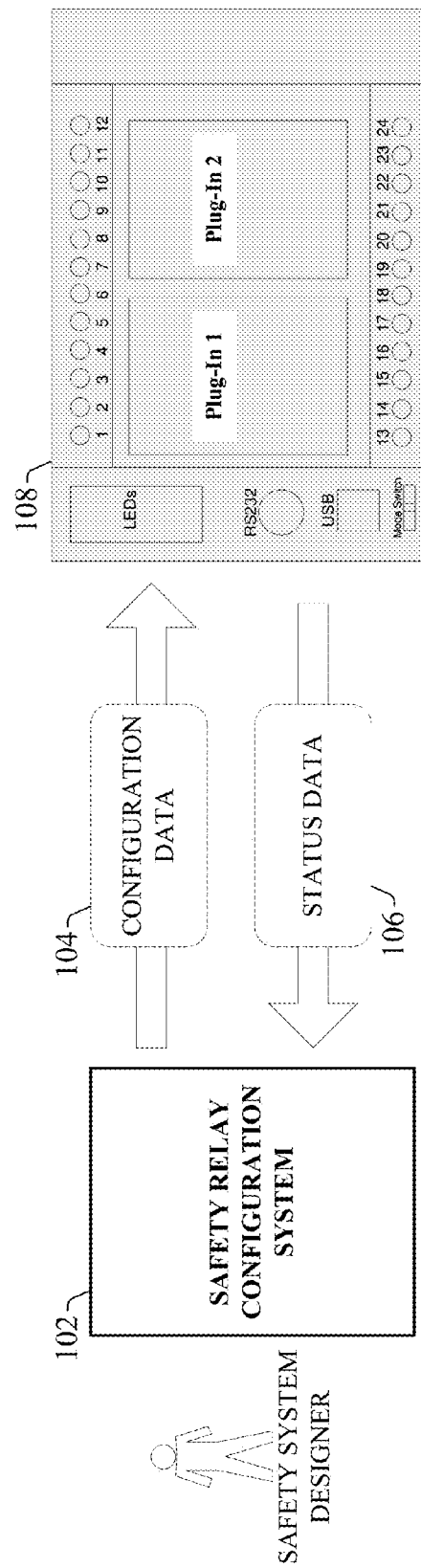
FIG. 1 is a general overview of the relationship between a safety relay configuration system and an industrial safety relay.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial system designers typically program the safety functions to be carried out by an industrial safety relay using a software development platform that is proprietary to the safety relay. The workflow for developing a safety relay program using these development platforms is often complicated, particularly as the number of safety relay terminals to be used for safety monitoring and output signaling grows larger. Moreover, the development interface layout of many safety relay programming platforms often yields a program visualization that is difficult to interpret and troubleshoot.

The safety relay configuration systems, software, and graphical interfaces described herein comprise a number of features that facilitate intuitive and simplified configuration of an industrial safety relay. These features include, for example, a programming environment that enforces an organized layout of function blocks that simplifies program building and yields an uncluttered program view that is easy to read and troubleshoot.

FIG. 1 is a general overview of the relationship between the safety relay configuration system 102 and an industrial safety relay 108. Safety relay 108 can comprise any suitable industrial safety relay or similar device configured to monitor an industrial safety system and control the ability of an industrial system or machine to start or run based on the monitored statuses of one or more safety devices (e.g., emergency stop buttons, safety mats, light curtains, emergency pull cords, etc.). The safety relay can comprise a number of input terminals for monitoring the status of one or more safety devices, and output terminals that control certain machine states based on the statuses of the safety devices. In an example configuration, power to selected control components of the industrial system or machine can be connected to the machine via the safety relay outputs, and the safety relay 108 can be programmed to close the outputs only when the relevant safety devices are in their respective safe states. To ensure control reliability, the safety relay 108 typically includes a number of integrated self-monitoring features to reduce the possibility of a relay failure and to ensure that the industrial system remains safe in the event of such a relay failure. These integrated safety features can include, for example, redundant circuits, internal monitoring to detect short-circuits between contacts, and other such features.

Safety relay 108 is programmable, allowing the user to configure the function of each input and output terminal and to develop logic that controls the behavior of each relay output based on the states of the safety device inputs. Accordingly, safety relay configuration system 102 is designed to communicate with safety relay 108 and to execute a configuration application that allows the user to configure and program safety relay 108. Safety relay configuration system 102 can communicate with safety relay 108 using any suitable communication means, including communication via a local connection between the configuration system and the safety relay 108 (e.g., universal serial bus, RS232, etc.), or over a networked connection (e.g., Ethernet, Modbus, Common Industrial Protocol, Controlnet, Devicenet, etc.). In one or more embodiments, safety relay configuration system 102 can also communicate with safety relay 108 remotely via the Internet.

Once communication between the safety relay configuration system 102 and safety relay 108 is established, the configuration system can download configuration data 104 to the safety relay based on configuration and programming input provided to the configuration system by the user. For example, the user can develop safety relay logic within the development environment of the configuration application executed by the configuration system 102, and download the developed program to safety relay 108. Additionally, safety relay configuration system 102 can read and display status data 106 from the safety relay 108. The configuration system can render status data 106 on a graphical environment having a similar structure to the development environment used to create the safety relay logic, allowing the user to monitor the statuses of the input devices and relay outputs within the logic environment.

Figure 2:
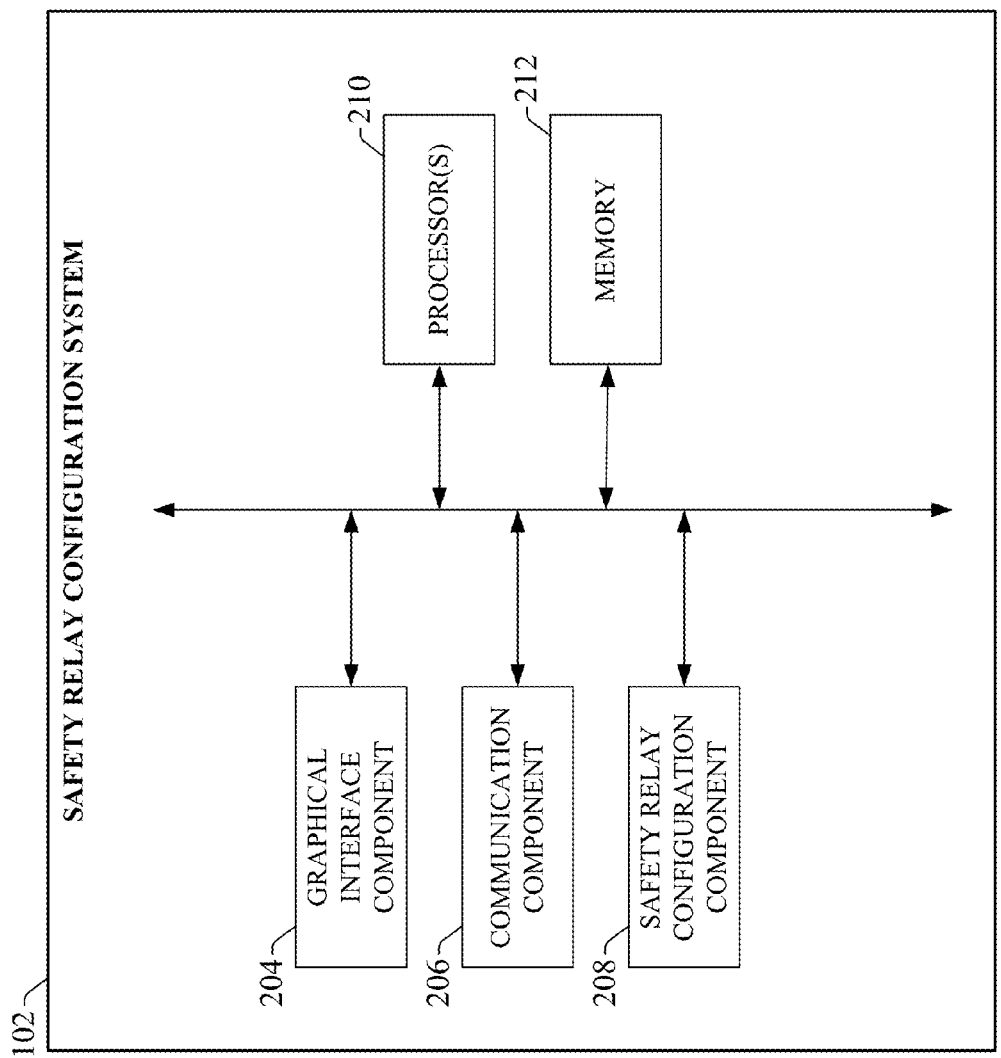
FIG. 2 is a block diagram of an example safety relay configuration system that facilitates configuration, programming, and monitoring of an industrial safety relay.

FIG. 2 is a block diagram of an example safety relay configuration system that can facilitate configuration, programming, and monitoring of an industrial safety relay. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

One or more embodiments of safety relay configuration system 102 can include a graphical interface component 204, a communication component 206, a safety relay configuration component 208, one or more processors 210, and memory 212. In various embodiments, one or more of the components 204-208, the one or more processors 210, and memory 212 can be electrically and/or communicatively coupled to one another to perform one or more of the functions of the safety relay configuration system 102. In some embodiments, components 204-208 can comprise software instructions stored on memory 212 and executed by processor(s) 210. The safety relay configuration system 102 may also interact with other hardware and/or software components not depicted in FIG. 2. For example, processor(s) 210 may interact with one or more external user interface devices, such as a keyboard, a mouse, a display monitor, a touchscreen, or other such interface devices.

Graphical interface component 204 can be configured to receive user input and to render output to the user in any suitable format (e.g., visual, audio, tactile, etc.). User input can be, for example, safety relay terminal configuration input, safety device selection input, function block selection and configuration input, user responses to prompts provided by the graphical interface component 204, or other such data. Communication component 206 can be configured to communicatively interface with the safety relay and exchange data between the relay and the configuration system. Communication between the configuration system and the safety relay can be via a local communication link such as USB, RS232, or the like, or via a remote connection over a network or the Internet.

Safety relay configuration component 208 can be configured to execute a safety relay configuration application having features and graphical interface characteristics to be described in more detail herein. The one or more processors 210 can perform one or more of the functions described herein with reference to the systems and/or methods disclosed. Memory 212 can be a computer-readable storage medium storing computer-executable instructions and/or information for performing the functions described herein with reference to the systems and/or methods disclosed.

Figure 3:
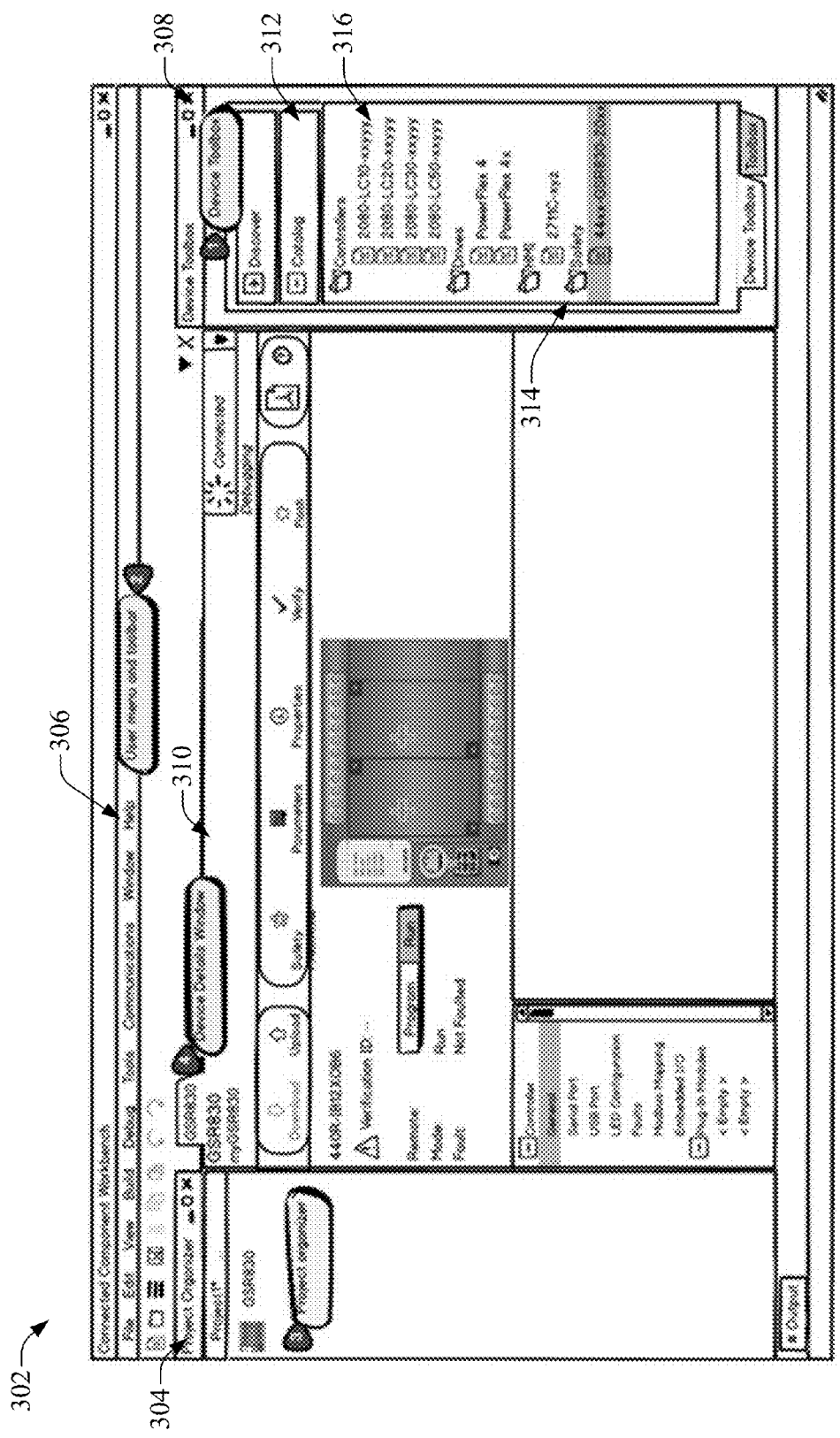
FIG. 3 is an example screen layout for a device configuration screen of a safety relay configuration system.

FIG. 3 is an example, non-limiting screen layout 302 for a device configuration screen of the safety relay configuration system. The example layout 302 includes a device toolbox area 308, a user menu and toolbar area 306, a project organizer area 304, and a device details area 310.

Figure 4:
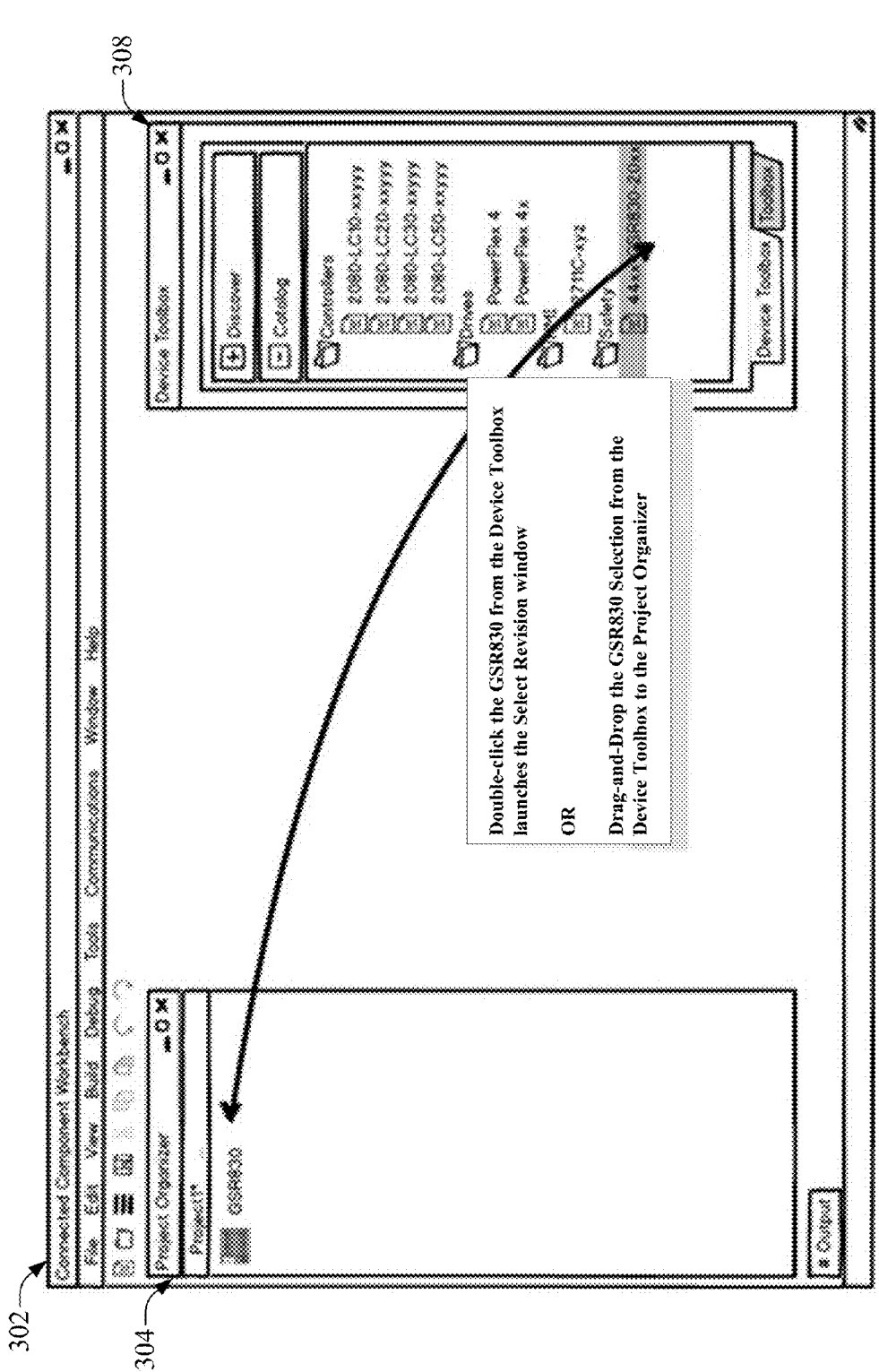
FIG. 4 is an example screen layout illustrating selection of a device from a list of available devices for inclusion in a project organizer area of the safety relay configuration system.

The device toolbox area 308 can include a catalog drop-down window 312. When expanded, catalog drop-down window 312 can display a list of available devices 316 for selection by the user for inclusion in the current project. The list of available devices 316 can be organized according to device type, with each device type displayed as an expandable node. For example, selecting the "Safety" node 314 can reveal a list of available safety relays. In some embodiments, hovering a cursor over one of the devices in the list invokes a pop-up window containing additional information about the selected device. A device from the list of available devices 316 can be added to the project organizer area 304 by double-clicking on the selected device in the list, or by dragging the selected device to the project organizer area 304. In either case, selection of a device from the list of available devices 316 causes the selected device to appear in the project organizer area 304, as shown in FIG. 4. Adding a device to the project organizer area 304 makes that device available for creation of a new project.

FIGS. 5a and 5b illustrate the device toolbox area 308 in more detail. FIG. 5a depicts the list of available devices with each device category node collapsed. When one of the category nodes is selected, the available devices under the selected category are expanded and displayed, as shown in FIG. 5b.

Figure 6:
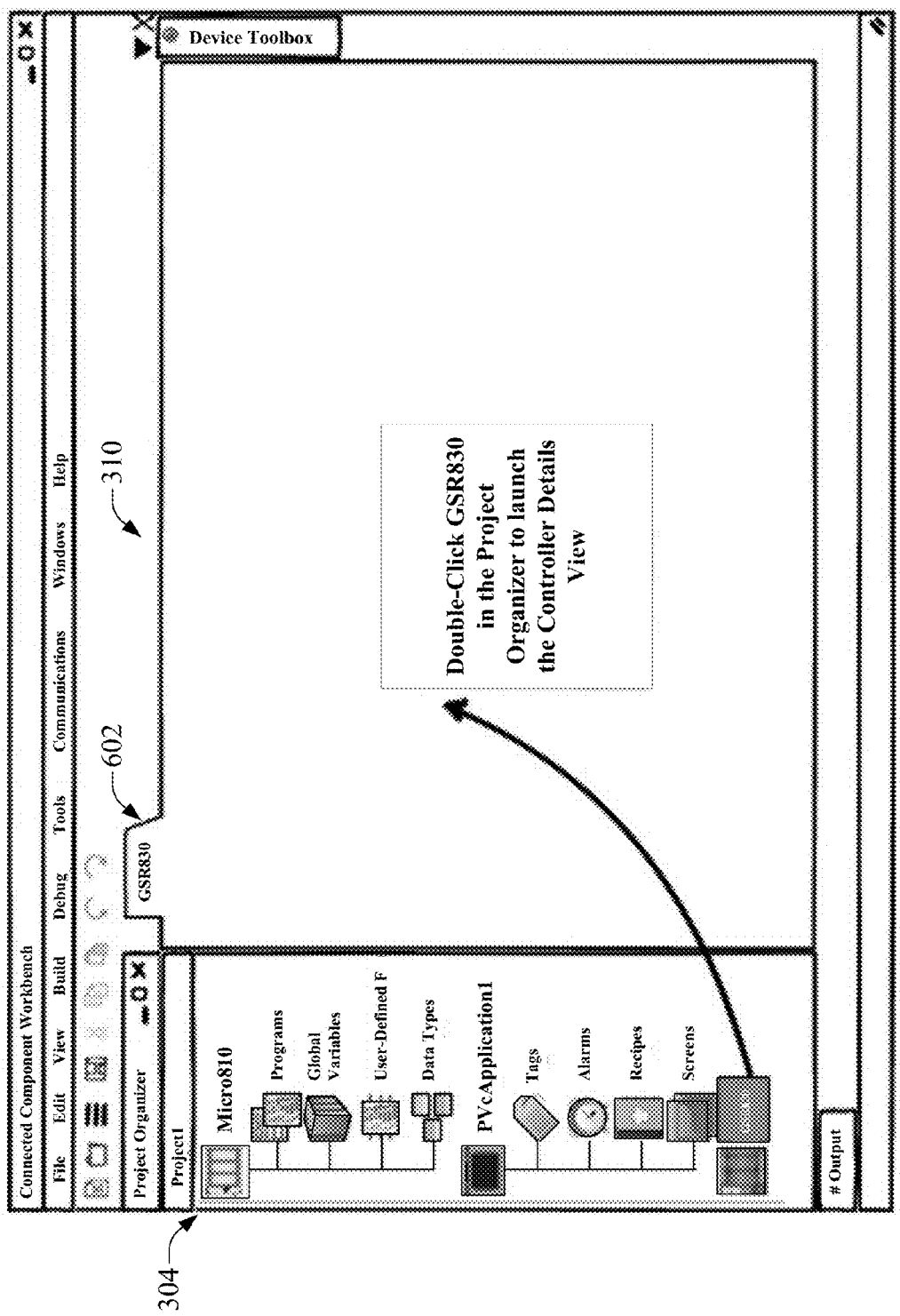
FIG. 6 is an example screen layout illustrating creation of a new project for a selected device on the project organizer area.

Turning now to FIG. 6, selection of a safety relay or other device within the project organizer area 304 (e.g., a safety relay or other device previously selected from the device toolbox area 308 for inclusion in the project organizer area 304) creates a new project for the selected device. In the illustrated example, a GSR830 safety relay is to be configured and programmed. Accordingly, a device icon corresponding to this type of safety relay is selected from the project organizer area 304, which launches a "controller details" view within the device details area 310. In the present example, a project tab 602 is displayed at the top of the device details area 310, which corresponds to the new project.

Figure 7:
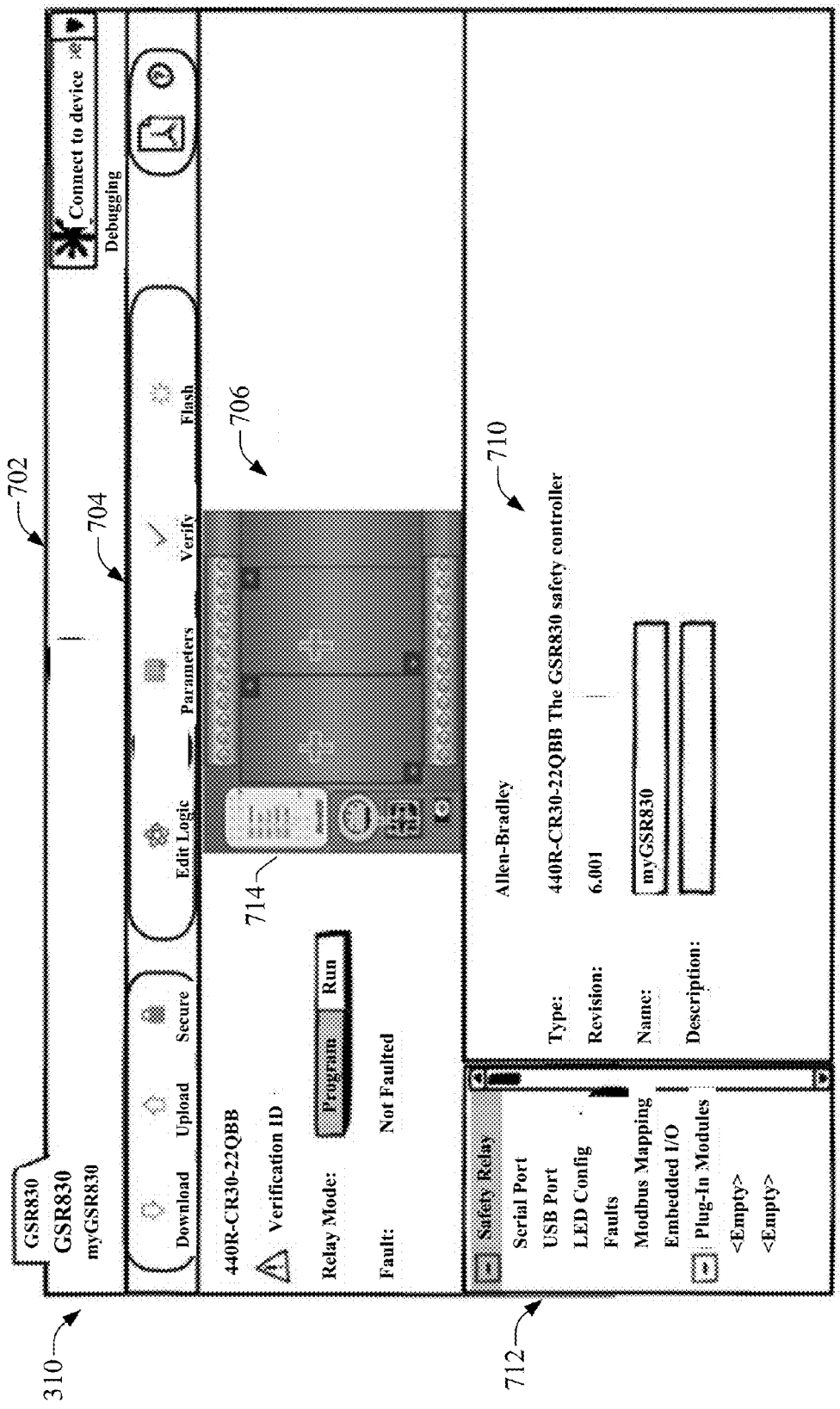
FIG. 7 is an example screen layout depicting sections of a device details area when a project for a selected safety device is open.

FIG. 7 illustrates the areas of the device details area 310 when a project for a selected safety device is open. Device details area 310 includes a device header 702 containing relevant information about the selected device, including the safety device's identity and connection information. Device toolbar area 704 lists a number of selectable operations and commands. These can include both common operations that pertain to all device types (e.g., upload, download, etc.) and device-specific operations that depend on the type of selected safety device (e.g., safety configure, validate, debug, secure, variables). Device toolbar area 704 can also include flash information, such as a manual for the safety device or on-line help information.

Device graphic view area 706 displays the name of the project and a graphical representation 714 of the selected safety device. If the safety relay configuration system is currently connected to the safety device, the device graphic view area 706 can also display operational status information for the device, such as the current mode of the device (program mode, running, etc.), whether the device is currently faulted, identification of the fault, etc. The user can also switch the mode of the safety relay between program mode and running mode from this area. This area also indicates whether the current project has been verified (e.g., the program has been checked for errors or inconsistencies prior to download), and displays a verification identifier for verified projects.

Figure 8:
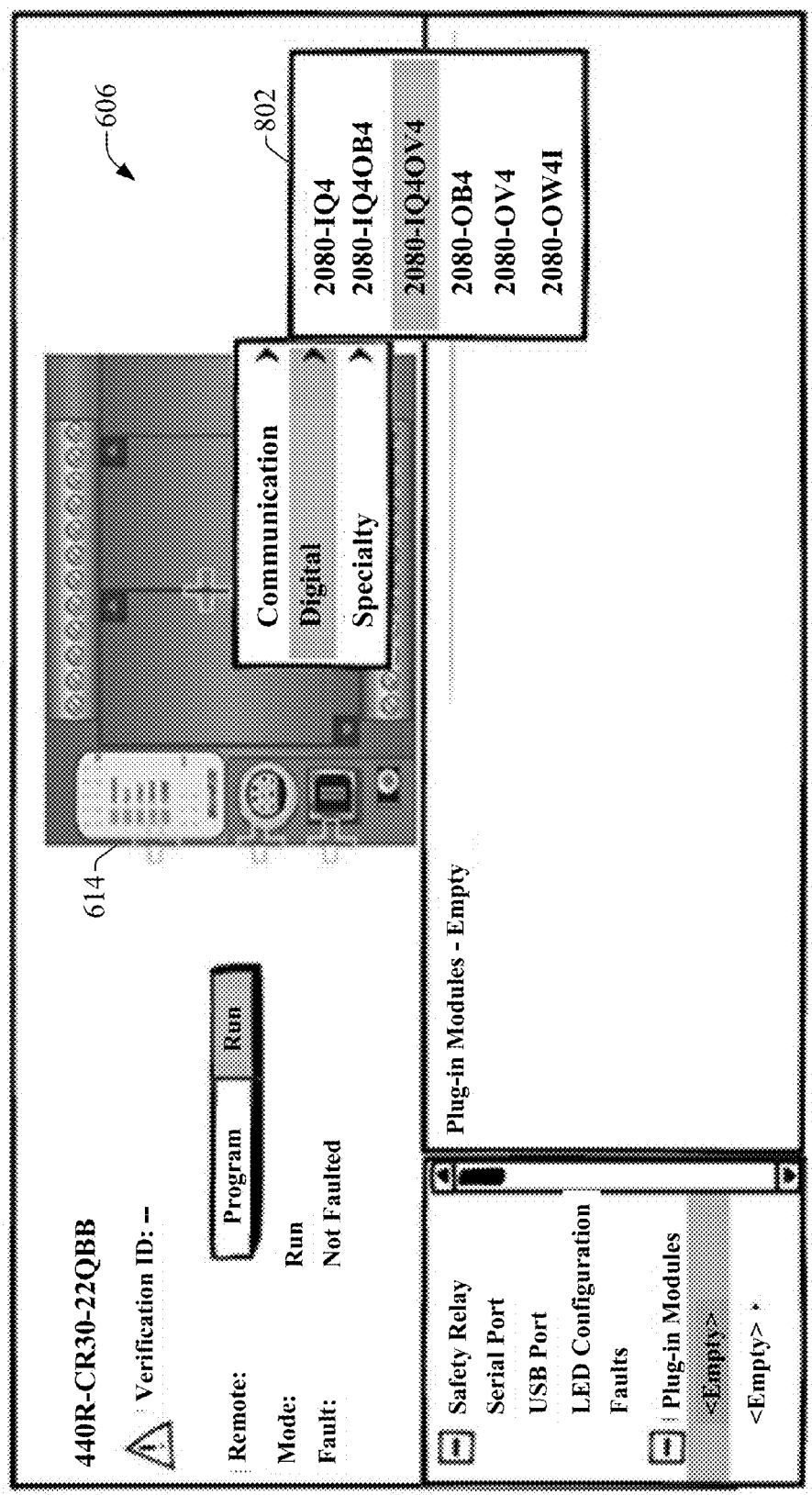
FIG. 8 is an example screen layout illustrating configuration of a plug-in module for a safety relay configuration project.
Figure 9:
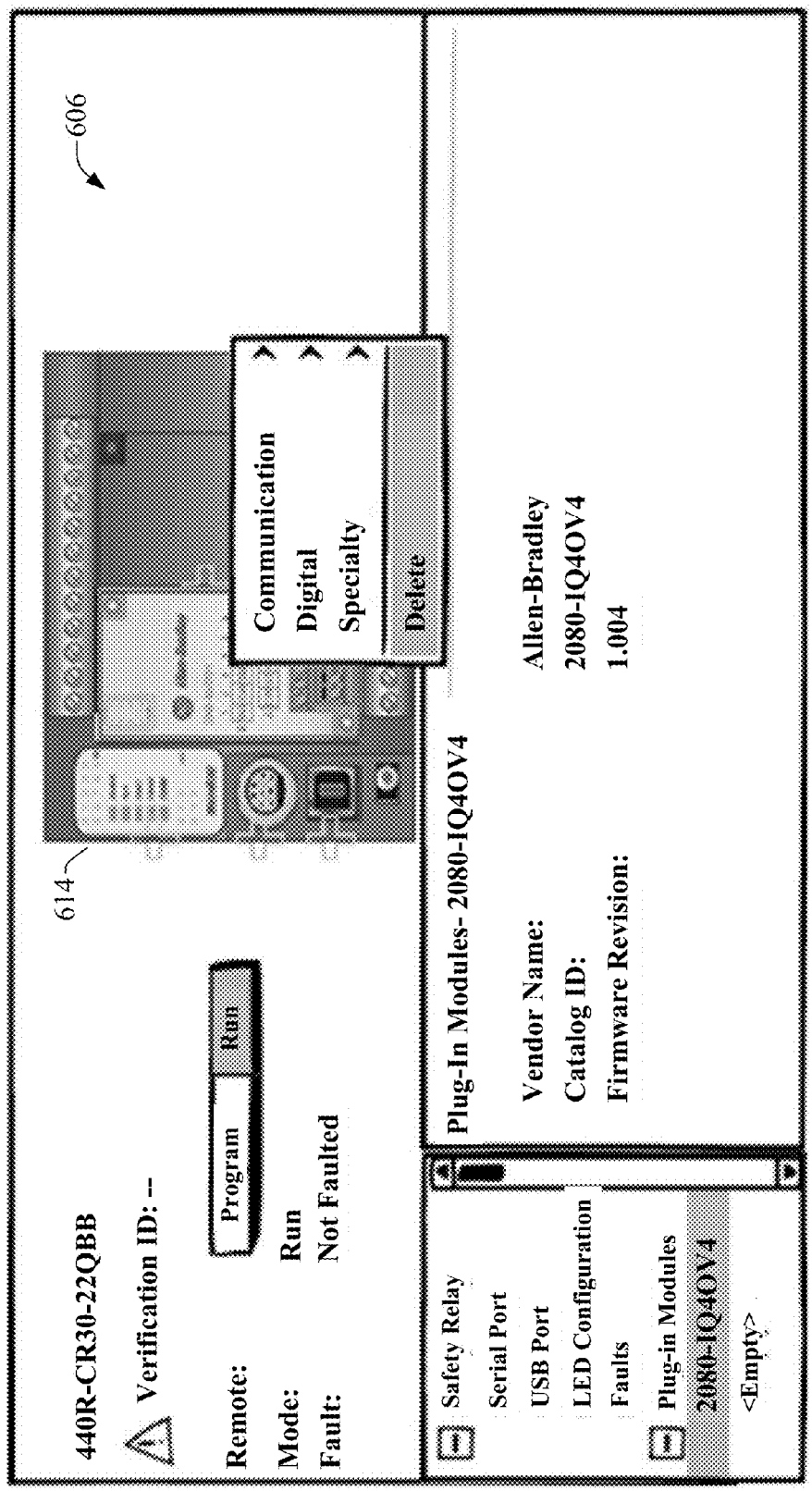
FIG. 9 is an example screen layout of a project window of the safety relay configuration system including a graphical representation of a plug-in module.

The user can also add configurations for any plug-in modules installed on the safety relay from the device graphic view area 706. In some embodiments, this can be performed by right-clicking or otherwise selecting an empty slot on the graphical representation of the safety relay, as illustrated in FIG. 8. This invokes a pop-up configuration window 802 that allows the user to select a category of the plug-in module (e.g., communication module, digital I/O module, or specialty module), and to select a particular model of the plug-in module within the selected category. Once selected, a graphical representation of the plug-in module appears on the graphical representation of the safety relay, as illustrated in FIG. 9.

Returning now to FIG. 7, device tree area 612 provides navigation to various configurable aspects of the selected safety device, including but not limited to the communication ports of the safety relay, the devices visual indicators (e.g., LEDs or other indicators), embedded inputs and outputs, and any plug-in modules that are attached to the safety relay (e.g., expansion I/O modules).

Device configuration property pane 610 allows the user to view and edit the current configuration of the selected safety relay. When the user selects an item from the device tree area 612, the device configuration property pane displays detailed configuration information for the selected item.

Figure 10:
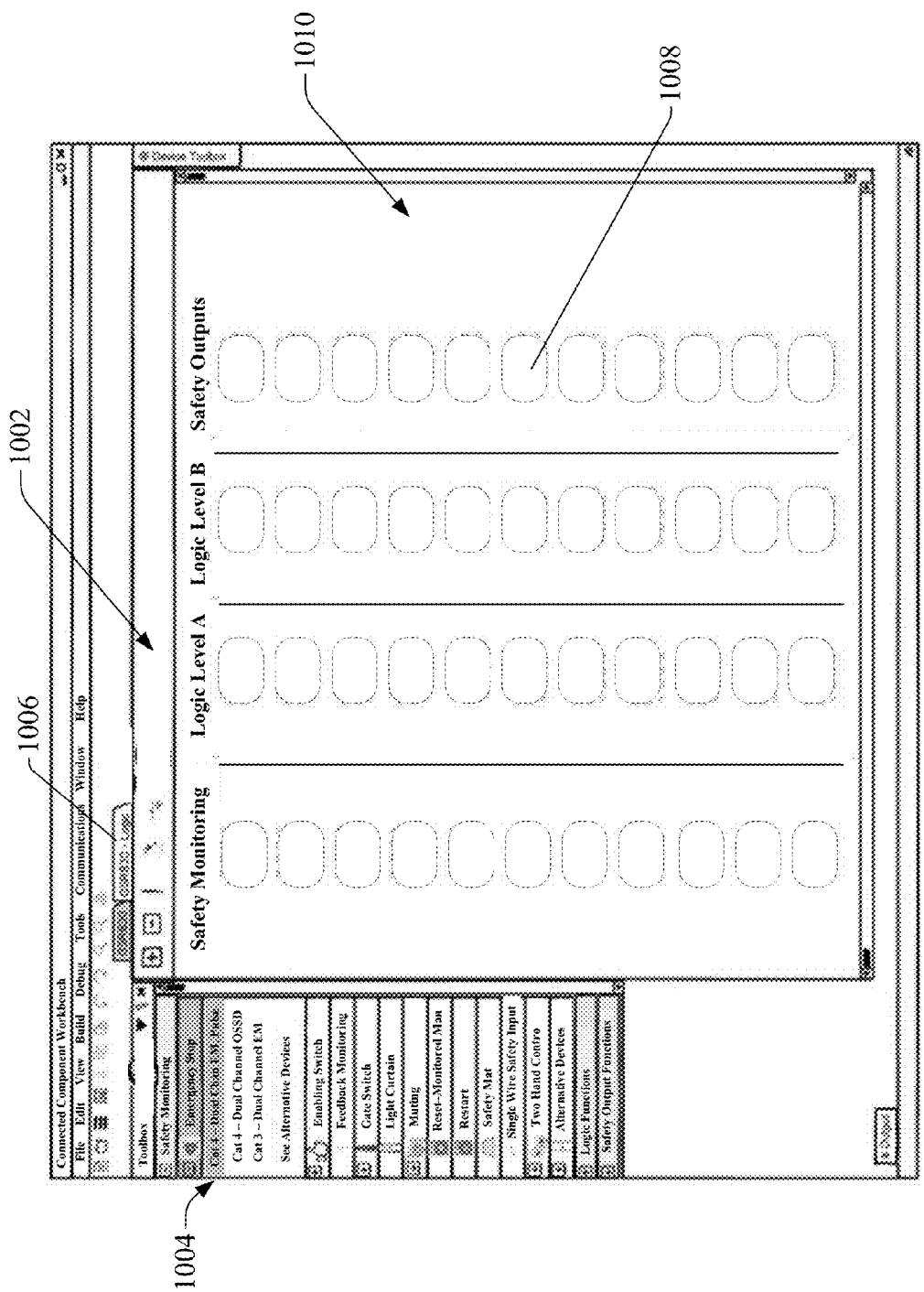
FIG. 10 is an example screen layout of a safety logic editor screen of the safety relay configuration system.

Selection of a logic editor button on the device toolbar area 604 launches a safety logic editor, as illustrated in FIG. 10. In some embodiments, the safety logic editor will be opened in a new tab 1006. In the illustrated example, a toolbox area 1004 containing selectable safety functions is located on the left-hand side of the screen, and a safety logic editor toolbar 1002 is located across the top of the window. The safety logic editor pane 1010 allows the user to create, view, and edit safety logic and configuration data for the safety relay associated with the current project. In FIG. 10, the safety logic editor pane 1010 is depicted in its blank state, which is presented to the user when a new project is created. As will be described in more detail herein, the safety relay configuration system allows the used to build safety logic programs for the safety relay by adding function blocks to available memory spaces 1008 on the safety logic editor pane 1010.

As illustrated in FIG. 10, the safety logic editor pane 1010 comprises a grid of four columns—Safety Monitoring, Logic Level A, Logic Level B, and Safety Outputs—with each column comprising a number of available memory spaces 1008. Memory spaces 1008 represent pre-defined positions on which function blocks can be added, and are arranged in a grid-like manner to enforce an organized arrangement of function blocks. Function blocks can be added to the respective memory spaces 1008 by selecting the function blocks from the toolbox area 1004. Function blocks can be organized within the toolbox area 1004 according to device type, logic function, safety monitoring function, or other suitable categories. The categories can be displayed as nodes within toolbox area 1004, such that selection of a node expands the selections available within the selected category.

The Safety Monitoring column of the safety logic editor pane 1010 will typically contain function blocks corresponding to safety input devices to be monitored by the safety relay (e.g., gate switches, light curtains, safety mats, emergency stop buttons, pull cords, etc.). The Logic Level A and B columns are used to contain logical operations that act on the safety inputs in a manner determined by the user in order to control how the safety inputs control the states of the safety outputs. The Safety Output column will typically contain function blocks corresponding to safety outputs of the safety relay. The safety relay configuration system allows each function block to be configured directly on the function block graphic, and allows the user to link function block inputs and outputs with connection lines (also referred to as signal flow lines) in order to build a complete safety relay program that can be downloaded to and executed on the safety relay. The column-wise classification of function block types yields an organized program visualization that is easy to interpret and troubleshoot. Moreover, as will be described in more detail herein, the use of pass-through function blocks can allow the user to modify interconnections between function blocks while minimizing necessary changes to related interconnections to accommodate the modified interconnections, thereby reducing development time and maintaining a readable program view.

Figure 11:
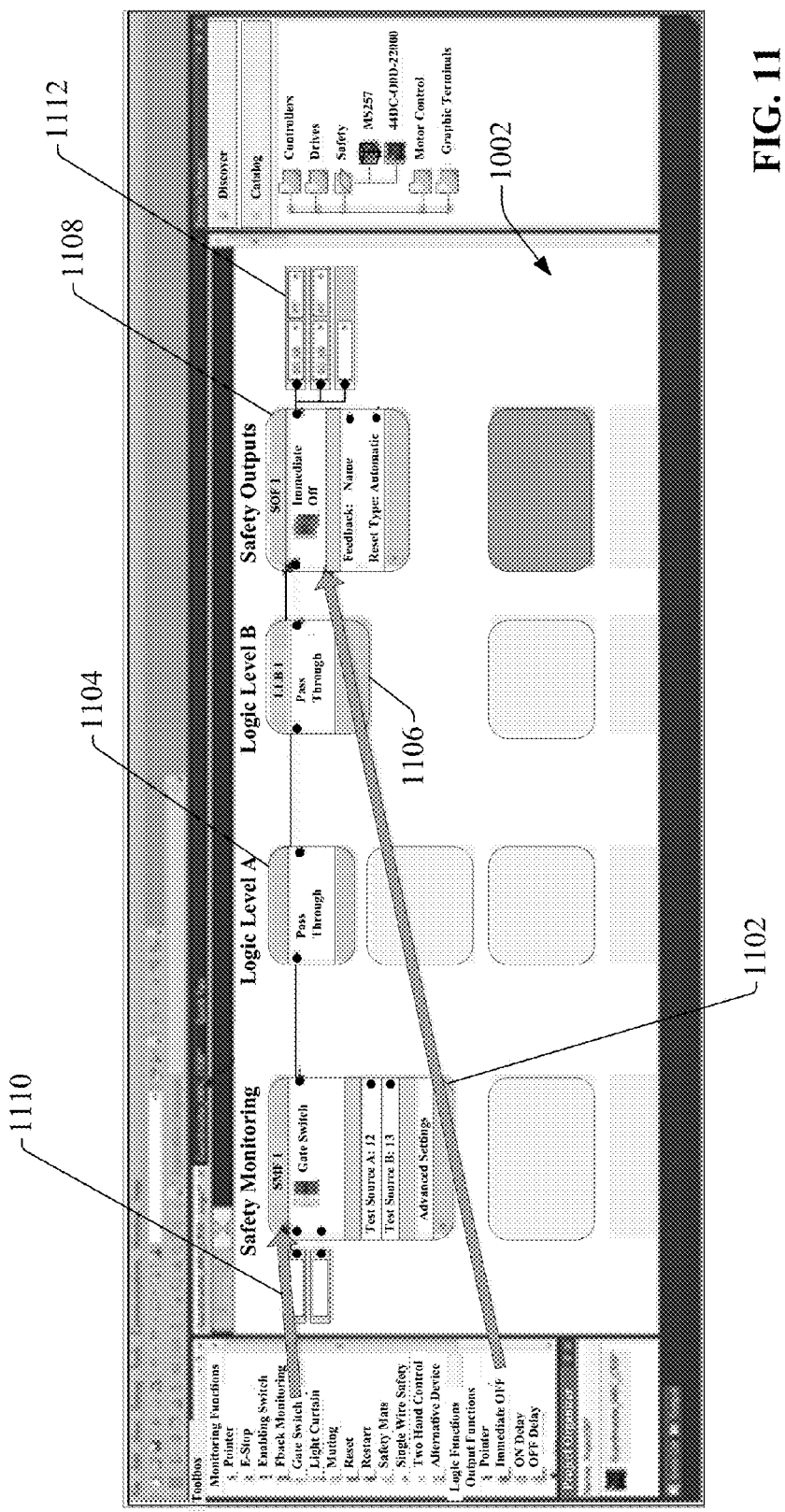
FIG. 11 is an example screen layout illustrating creation of an example safety relay logic program.

An example workflow is now described with reference to FIG. 11 in order to provide a general overview of the process for building safety relay programs according to one or more embodiments. In this example, a gate switch is to be monitored by the safety relay, and the user is to develop logic for controlling a safety relay output based on the monitored status of the gate switch. Accordingly, a Gate Switch function block 1102 selected from the Safety Monitoring Functions tree of the toolbox area and dragged to an available memory space of the safety monitoring column of the safety logic editor pane 1010. As will be described in more detail herein, the safety relay configuration system automatically assigns to available (unused) input terminal addresses 1110 to the Gate Switch function block 1102 when the function block is added to the program. If desired, these input terminal addresses can be changed if the user wishes to assign different input terminals to the Gate Switch function block 1102. Other configuration settings for the Gate Switch function block 1102 can be set through interaction with the Gate Switch function block 1102.

Next, the user selects a Safety Output function block 1108 from the Safety Output Functions tree of the toolbox area and drags this function block to an available memory space of the Safety Outputs column of the safety logic editor pane 1010. Similar to the Gate Switch function block 1102, the safety relay configuration system will automatically assign two available (unused) safety relay output terminal addresses 1112 to the Safety Output function block 1108. These output addresses can be changed by the user if desired through interaction with the function block on the editor pane. Other configuration settings for the Safety Output function block 1108 can be set through interaction with the function block. For example, the Reset Type for the Safety Output function block 1108 can be changed from Manual to Automatic by selecting the appropriate setting from a drop-down box on the function block.

In this example, no logical operators are to be performed on the gate switch status, but instead the safety output is to be directly controlled by the status of the gate switch. Accordingly, the user can directly connect the output of the Gate Switch function block 1102 to the input of the Safety Output function block 1108. This can be performed, for example, by clicking on the input of the Safety Output function block 1108 (which is colored blue to indicate that no connection has yet been made), then clicking on the output of the Gate Switch function block 1102 (similarly colored blue when no connection is yet made). In response to these selections, the safety relay configuration system automatically creates two pass-through blocks between the Gate Switch and Safety Output function blocks in the Logic Level A and B columns, respectively, and draws a connection line between the two function blocks through the two pass-through blocks. The pass-through blocks perform no logical functions, but merely pass status information, unchanged, from their inputs to their outputs.

Once the logic program is completed, the user can compile and download the program to the safety relay by selecting appropriate controls on the device toolbar area 604.

Figure 12:
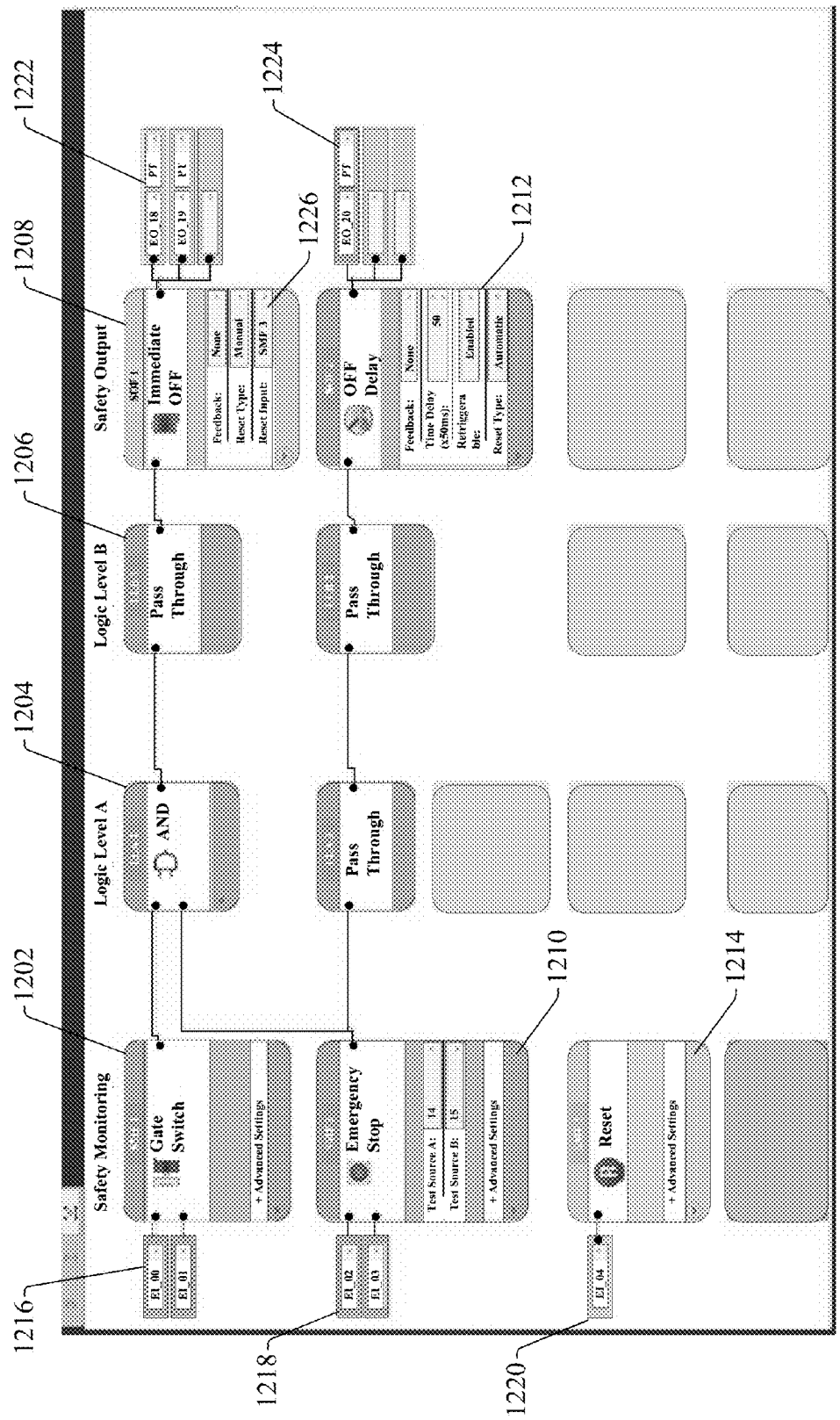
FIG. 12 is an example screen layout illustrating an example safety relay logic program.

FIG. 12 illustrates another example logic program according to one or more embodiments. In this example, the safety monitoring column contains three safety monitoring blocks corresponding to three safety input devices—a Gate Switch function block 1202, an Emergency Stop function block 1210, and a Reset function block 1214. Each of the safety monitoring function blocks have been assigned to selected input terminals of the safety relay using address windows 1216, 1218, and 1220. The outputs of Gate Switch function block 1202 and Emergency Stop function block 1210 have been connected to respective two inputs of an AND function block 1204 in the Logic Level A column. The AND function block generates a high signal on its output when the outputs of the Gate Switch function block 1202 and the Emergency Stop function block 1210 are both ON. The output of the AND function block 1204 is connected to the input of an Immediate OFF function block 1208 in the Safety Output column, via a pass-through function block 1206. The Safety Output column controls two output terminals of the safety relay—designated in address window 1222—based on the output of the AND function block and the configuration settings specified by the user on the function block 1208.

The output of the Emergency Stop function block 1210 is also connected to an OFF Delay function block 1212 in the Safety Output column (via two pass-through function blocks). By this configuration, the OFF Delay function block 1212 controls the output terminal designated in the address window 1224 based on the output of the Emergency Stop function block 1210.

Reset function block 1214 has been designated an available input terminal address in address window 1220, and has been linked to the Immediate OFF function block 1208 by reference using the Reset Input window 1226 on the Immediate OFF function block 1208. In this way, the Reset function block 1214, controlled by input address specified in 1220, is configured to reset the Immediate OFF function block 1208.

In addition to development, the safety logic layout depicted in FIG. 12 can also be used to monitor the safety relay logic during runtime after the logic has been downloaded to the relay. During runtime monitoring, live status information corresponding to the respective safety monitoring devices and outputs can be overlaid over their respective function blocks. Additionally, the function blocks can include color animation that changes the color of the function blocks based on their respective current statuses.

Figure 13:
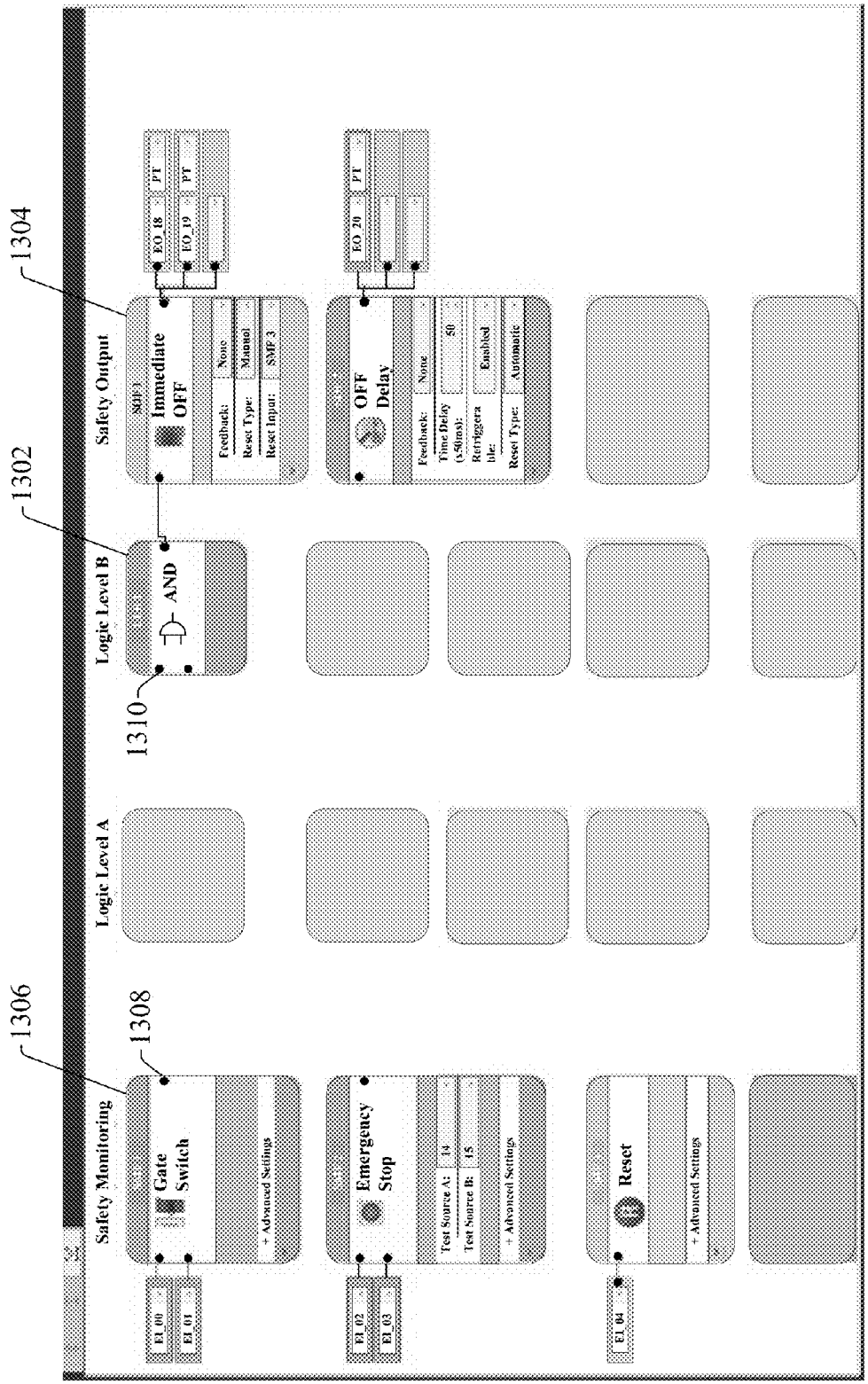
FIG. 13 is a layout view of a safety logic program in the process of development.
Figure 14:
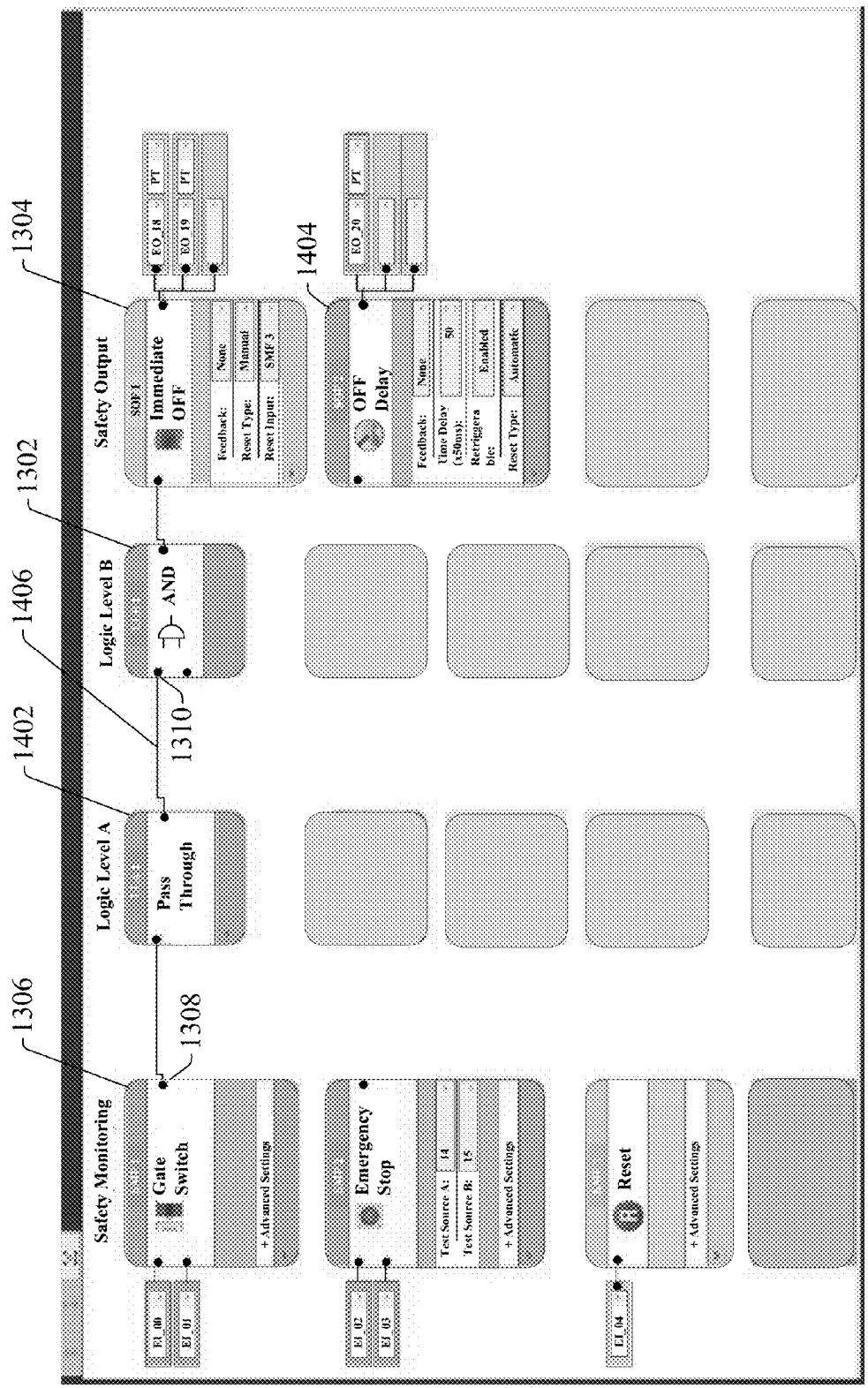
FIG. 14 is a layout view of a safety logic program illustrating automatic insertion of a pass-through block.

The use of pass-through function blocks to organize the program view is now described with reference to FIGS. 13-17. FIG. 13 is a layout view of a safety logic program in the process of development. In this example, a first safety output function block 1304 (Immediate OFF) has been placed in the Safety Output column of the development environment, and an AND function block 1302 has been placed in the Logic Level B column in the same row as the safety output function block 1304. The output of the AND function block 1302 has been linked to the input of safety output function block 1304. A safety monitoring function block 1306 (corresponding to a gate switch) has been placed in the Safety Monitoring column. The user wishes to connect the output 1308 of the safety monitoring function block 1306 to an input 1310 of the AND function block 1302, so that the Immediate OFF function of safety output function block 1304 will be jointly controlled by the state of safety monitoring function block 1306 (the gate switch state) and that of another function block to be determined Since the output 1308 of safety monitoring function block 1306 will be connected directly to the 1310 input of the AND function block 1302, there is no need for an operator function block to be placed in the Logic Level A column between safety monitoring function block 1306 and AND function block 1302. However, as illustrated in FIG. 14, when the user connects the output 1308 of safety monitoring function block 1306 to the input 1310 of AND function block 1302 (e.g., by clicking output 1308 and input 1310 in succession or by another interaction with the function blocks), the configuration interface inserts a pass-through block 1402 in the Logic Level A column between safety monitoring function block 1306 and AND function block 1302 in the same row as those function blocks. The system then links output 1308 to input 1310 via pass-through block 1402.

Figure 15:
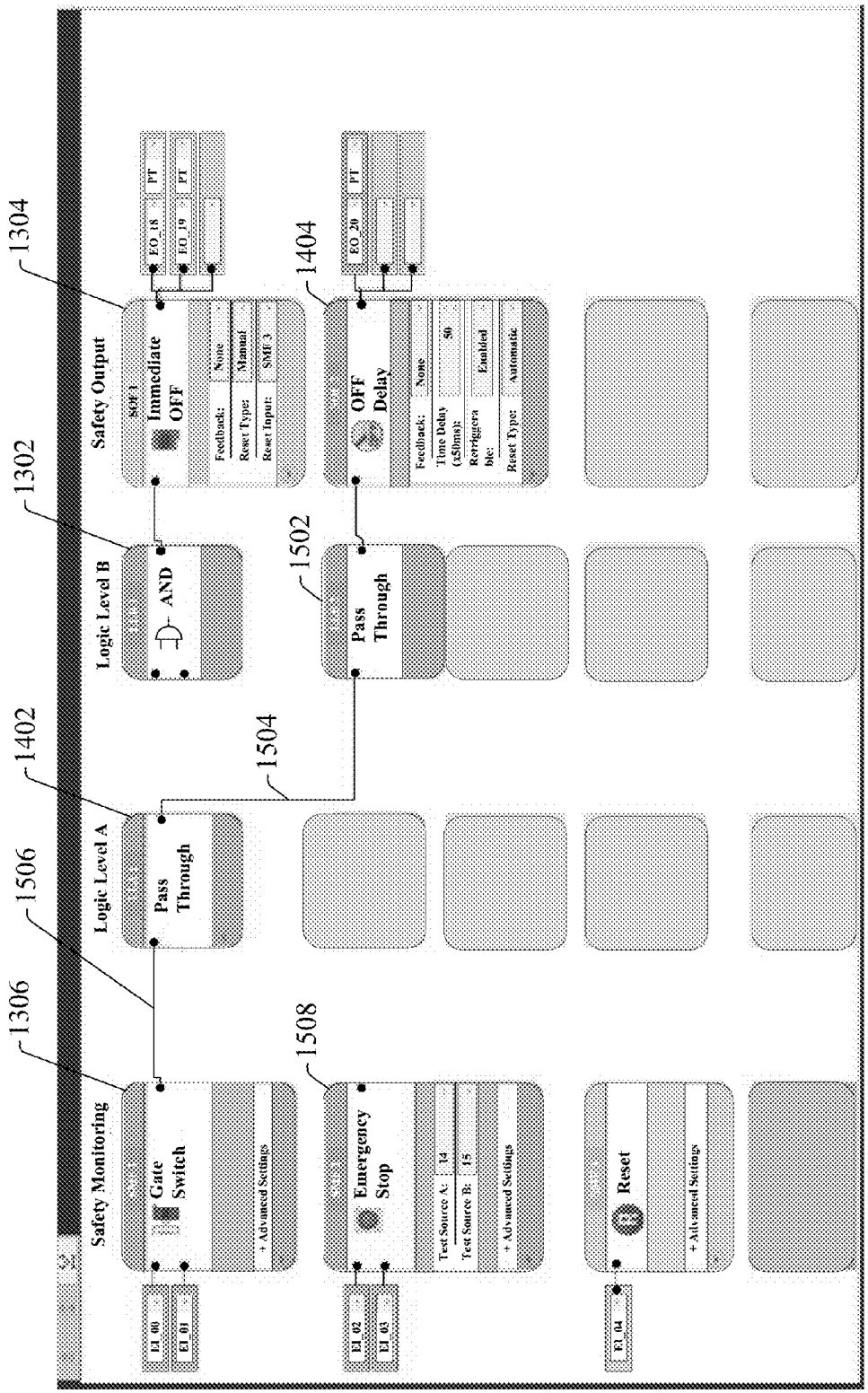
FIG. 15 is a layout view of a safety logic program in which an output of a pass-through block has been re-routed to a different safety output function block.

Although performing no operation on the output of safety monitoring function block 1306 before passing the output to AND function block 1302, the pass-through block 1402 assists in organizing and managing the connecting lines between function blocks to create an orderly arrangement of function blocks and interconnections. In addition to rendering a readable program visualization that can be followed and understood easily, the use of pass-through blocks to minimize the number of interconnection lines that must be reconfigured when the user modifies a connection. For example, the user may decide to disconnect the output of safety monitoring function block 1306 from AND function block 1302 and reconnect the safety monitoring function block output to the input of a second safety output function block 1404 (an OFF Delay function block). The user can perform this reconnection either by deleting connection line 1406 and creating a new connection line between the output of the pass-through block 1402 and the input of safety output function block 1404, or by dragging the end of connection line 1406 connected to the input 1310 of AND function block 1302 to the input of safety output function block 1404. As shown in FIG. 15, when this reconnection is implemented by the user, the system creates another pass-through block 1502 in the Logic Level B column, through which pass-through block 1402 connects to safety output function block 1404. All connecting lines to the left of pass-through block 1402 (e.g., connection line 1506) remain unchanged.

Figure 16:
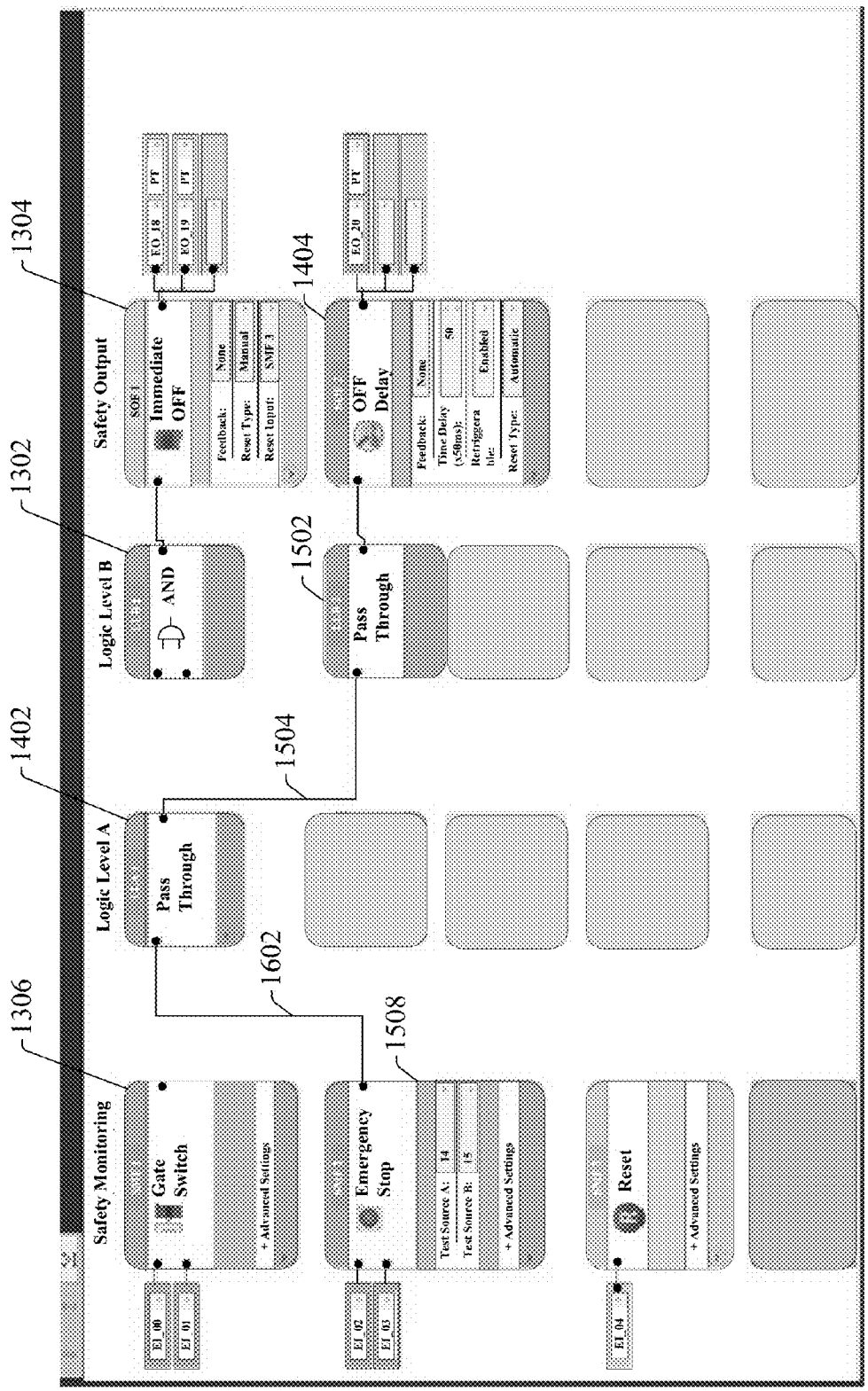
FIG. 16 is a layout view of a safety logic program in which an input of a pass-through block has been re-routed to a different safety monitoring function block.
Figure 17:
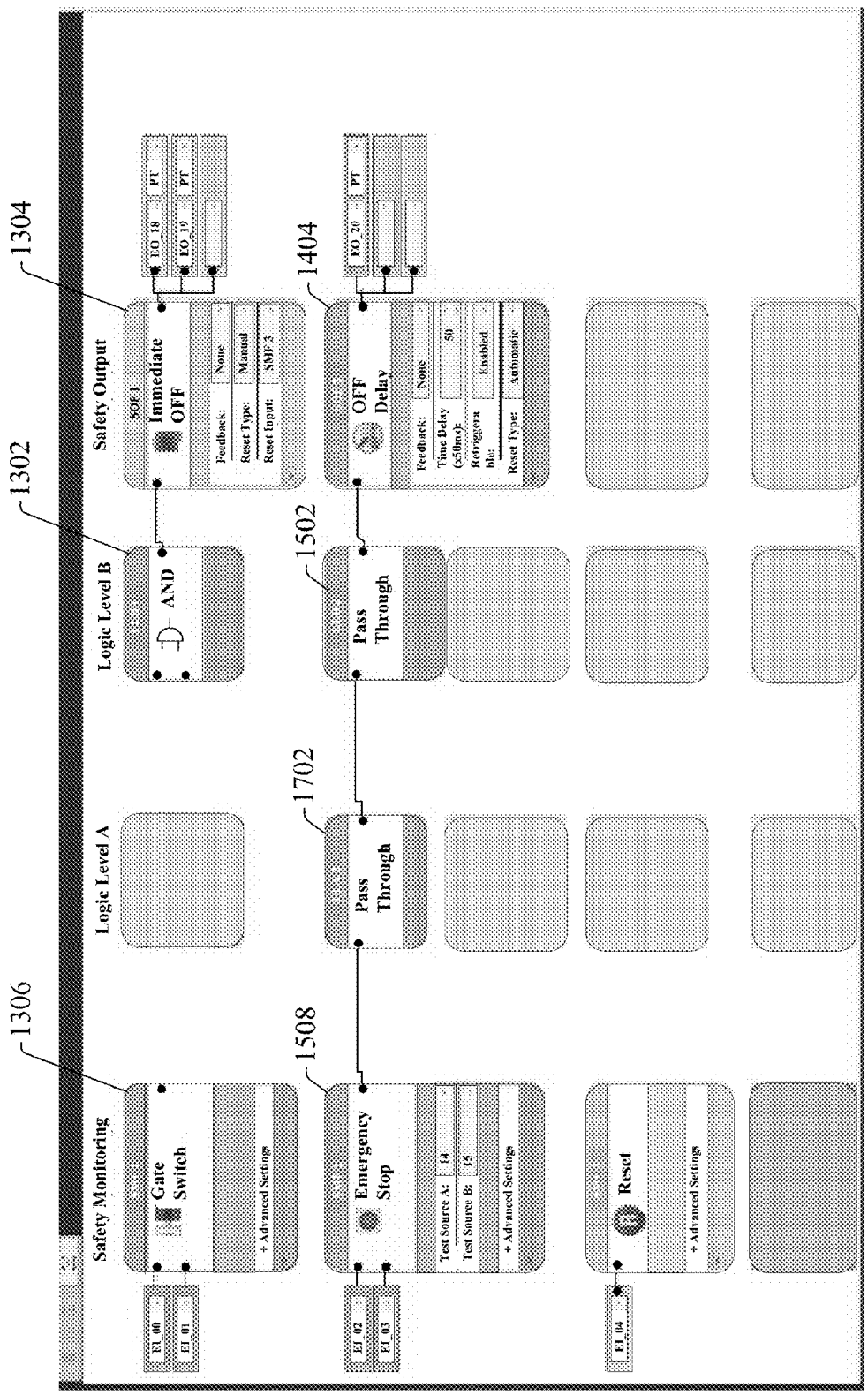
FIG. 17 is a layout view of a safety logic program in which a pass-through function block has been automatically moved to a different row in response to a signal flow line modification.

If the user subsequently wishes to change the input of safety output function block 1404 from safety monitoring function block 1306 to safety monitoring function block 1508, connection line 1506 can be deleted and—as illustrated in FIG. 16—a new connection line 1602 can be created between safety monitoring function block 1508 and pass-through block 1402. This changes the controlling safety device for the OFF delay from the gate switch of function block 1306 to the emergency stop button of function block 1508. Since connecting pass-through block 1402 to safety monitoring function block 1508 causes the connecting lines between function blocks 1508 and 1404 to unnecessarily jump from the second row to the first row, the configuration system can automatically create a new pass-through block 1702 in the second row of the Logic Level A column in response to the user's command reconnection, as shown in FIG. 17. The system then connects safety monitoring function block 1508 to pass-through block 1502 via pass-through block 1702, yielding a more linear connection between function blocks 1508 and 1404.

Figure 18:
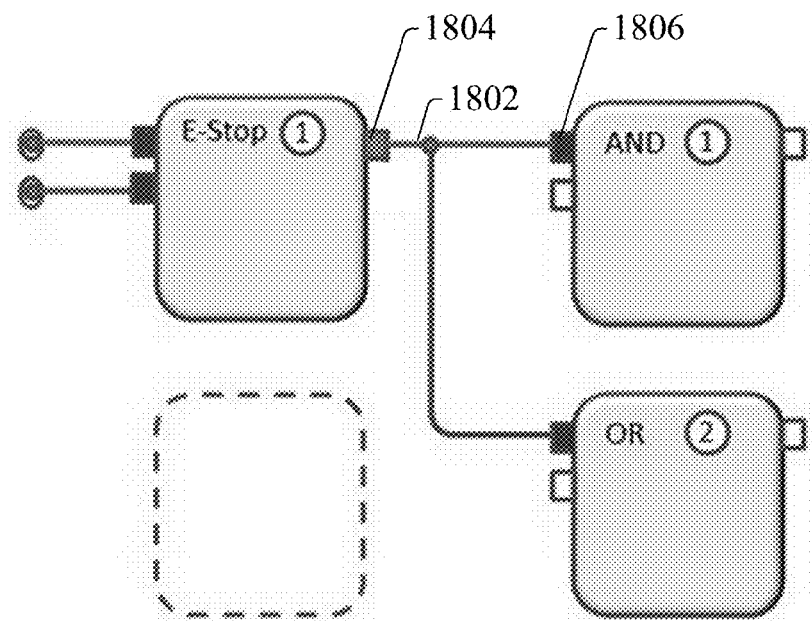
FIG. 18 is a diagram illustrating connection of function block inputs and outputs using signal flow lines.
Figure 19:
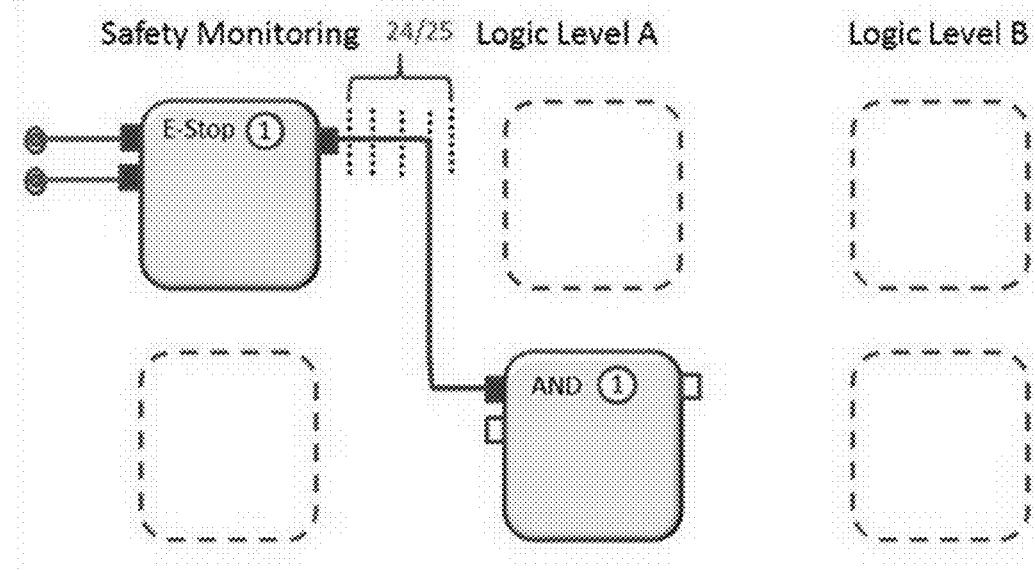
FIG. 19 is a diagram illustrating an editing environment that maintains a fixed horizontal distance between function blocks.

Using pass-through blocks to organize connecting lines, the safety relay configuration interface prevents overlap between connecting lines, reducing possible confusion and allowing the program to be read and understood more easily. The configuration system's editing environment also supports signal flow line drawing rules that control routing of signal flow lines to prevent overlap of signal flow lines between the function blocks. As illustrated in FIG. 18, a signal flow line 1802 is typically used to logically tie the output 1804 of one function block to an input 1806 of another function block. In one or more embodiments, the function block columns of the safety relay configuration system's editing environment can enforce a fixed horizontal distance between function blocks, as illustrated in FIG. 19. When the X,Y coordinate locations of function blocks are restricted in this fashion, a line drawing rule set can be designed that results in aesthetically consistent, easily followed signal flow lines throughout the project. For example, the system can enforce a line drawing rule specifying that a first instance of a line break (that is, a 90 degree bend in order to connect to an input on a different horizontal level) within a column must break 90 degrees from horizontal 24/25ths of the horizontal distance between two columns, while a second instance of a line break in the column must break 90 degrees from the horizontal 23/25ths of the horizontal distance between the two columns. Such rules will ensure that no wiring connection from two separate output pins will share the same vertical line location on the graphical interface.

In a related aspect, the various organization elements and their spacing on the function block editing environment can have respective fixed widths, allowing a full, completed safety relay configuration to be printable without compression.

Figure 20:
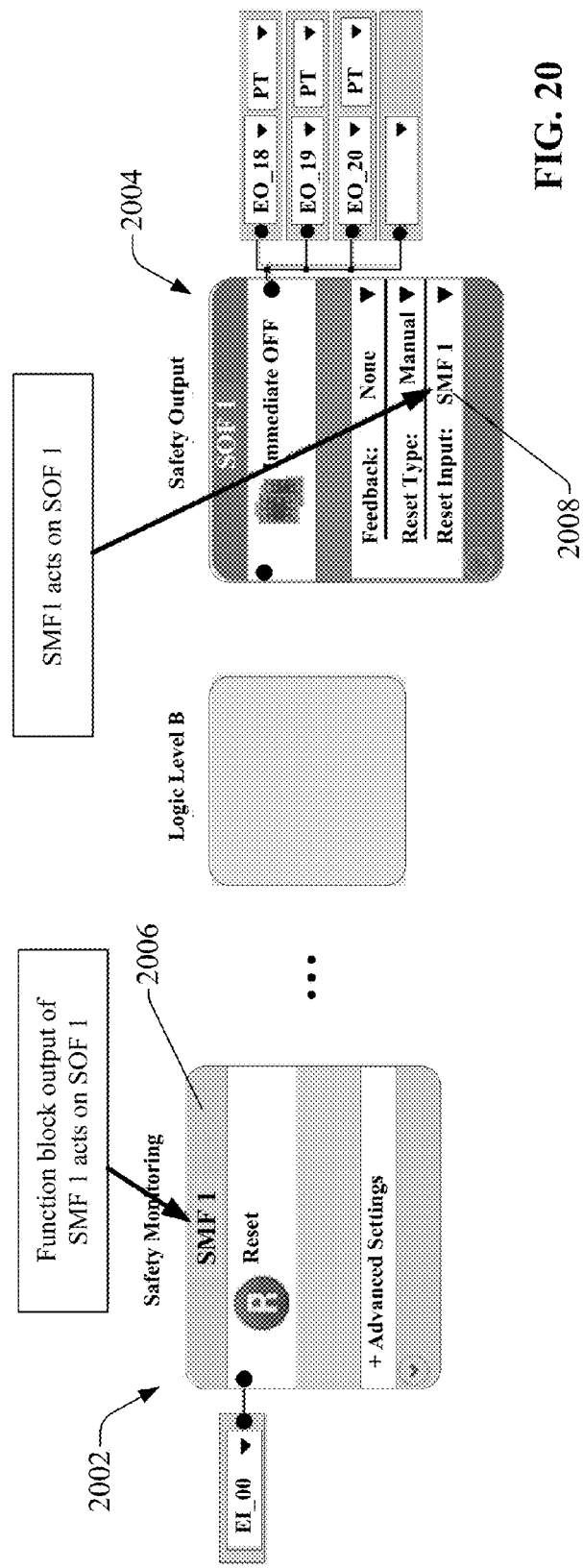
FIG. 20 is a function block diagram illustrating function block referencing.

One or more embodiments of the safety relay configuration system can also reduce the number of signal flow lines on a project by supporting function block references between function blocks. This aspect allows a first function block whose output is acting on another function block located multiple columns adjacent to the first function block to make an association by a combo box selection rather than by creating a signal flow wire that spans multiple columns. FIG. 20 illustrates an example of this type of function block referencing. In this example, safety output function block 2004 is linked to the Reset function block 2002 by selecting the name of function block 2002 ("SMF 1," found in the name bar 2006 of Reset function block 2002) in the Reset Input window 2008 of safety output function block 2004. This name-based referencing mitigates the need to create a signal flow line between the Reset function block 2002 and the safety output function block 2004.

Figure 21:
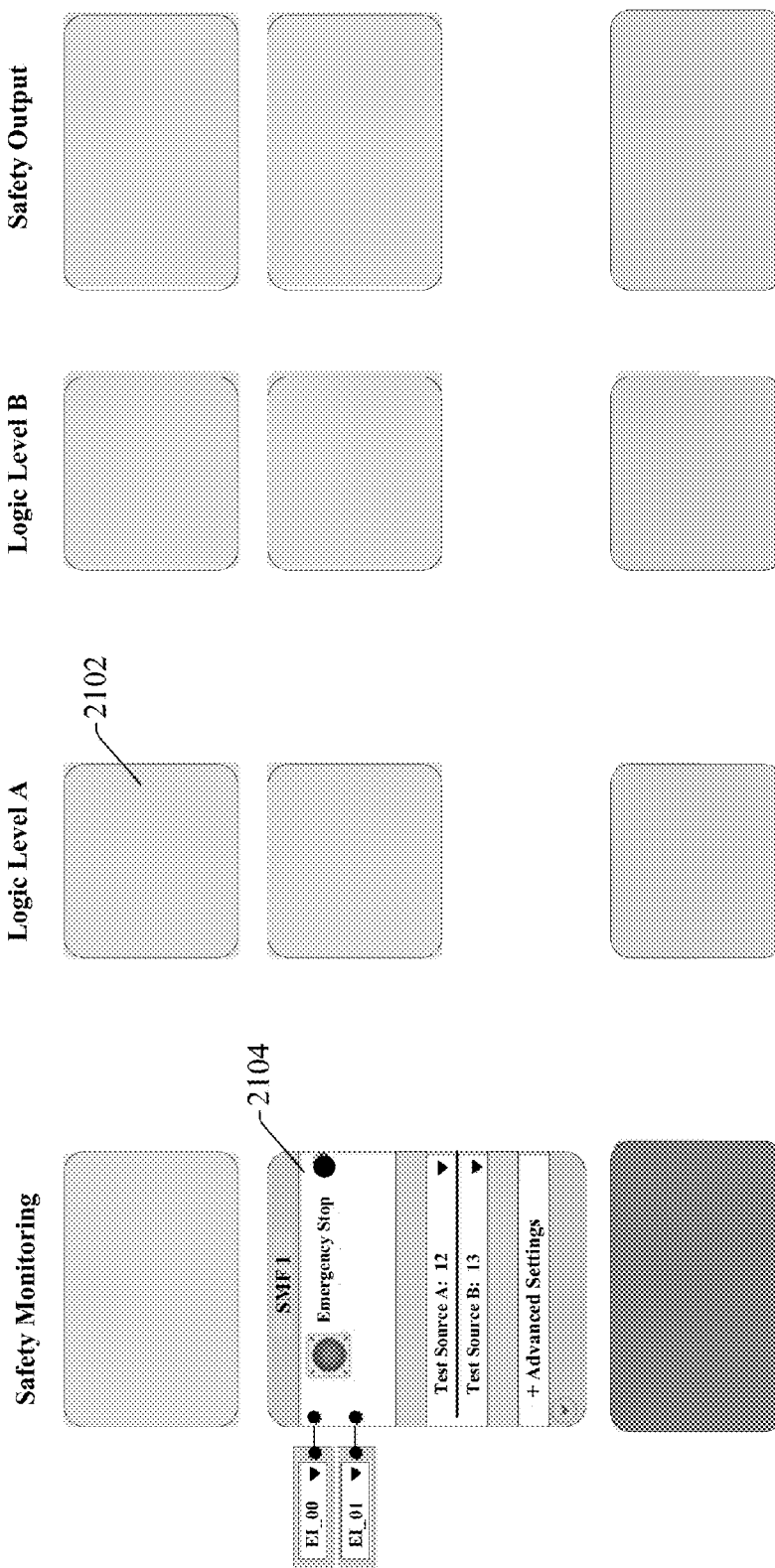
FIG. 21 is an example development environment in which available memory is represented by function block targets.

One or more embodiments of the safety monitoring configuration system can also provide a real-time graphical representation of an amount of memory consumed in the function block editor against a total available memory. As illustrated in FIG. 21, this can be achieved using a memory map in which available memory is represented as individual blank function block targets 2102. When a function block (e.g., function block 2104) is assigned to a blank function target, either by dragging-and-dropping the function block 2104 to the target or through other assignment means, the blank target disappears and the selected function block is displayed in its place. The label in the name bar of the function block (SMF 2) corresponds to the memory location of the function block. The number of available blank function block targets 2102 is analogous to the amount of remaining memory space available for addition of more function blocks. When all blank function block targets 2102 have received a function block assignments, no more function blocks can be added to the project. The function block targets 2102 intuitively convey an amount of available memory remaining for addition of function blocks to a project.

Figure 22:
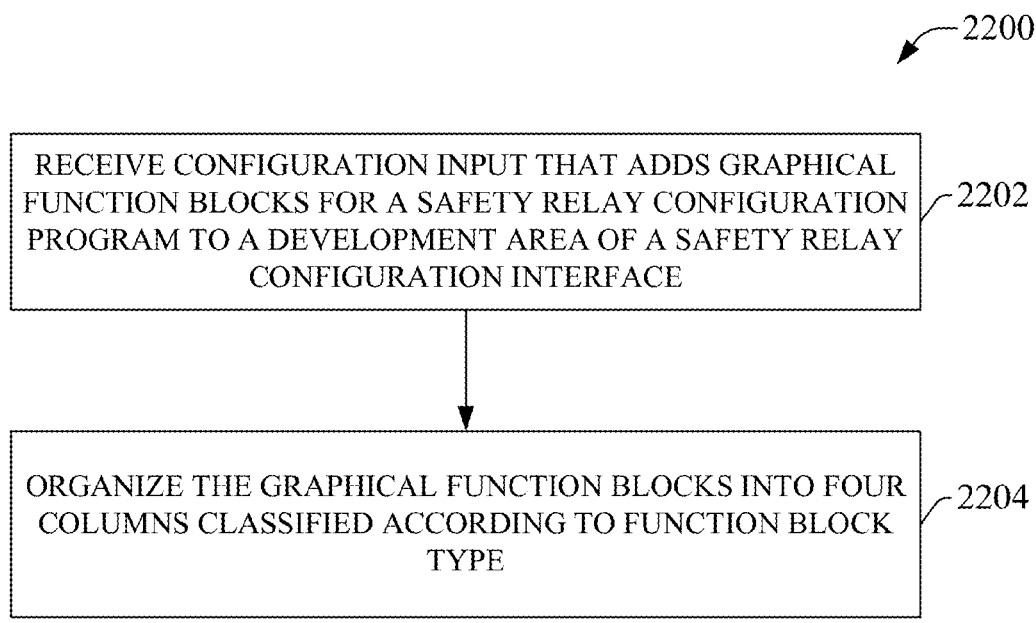
FIG. 22 is a flowchart of an example methodology for organizing graphical function blocks of a safety relay program on a development area of a safety relay configuration system interface.
Figure 23:
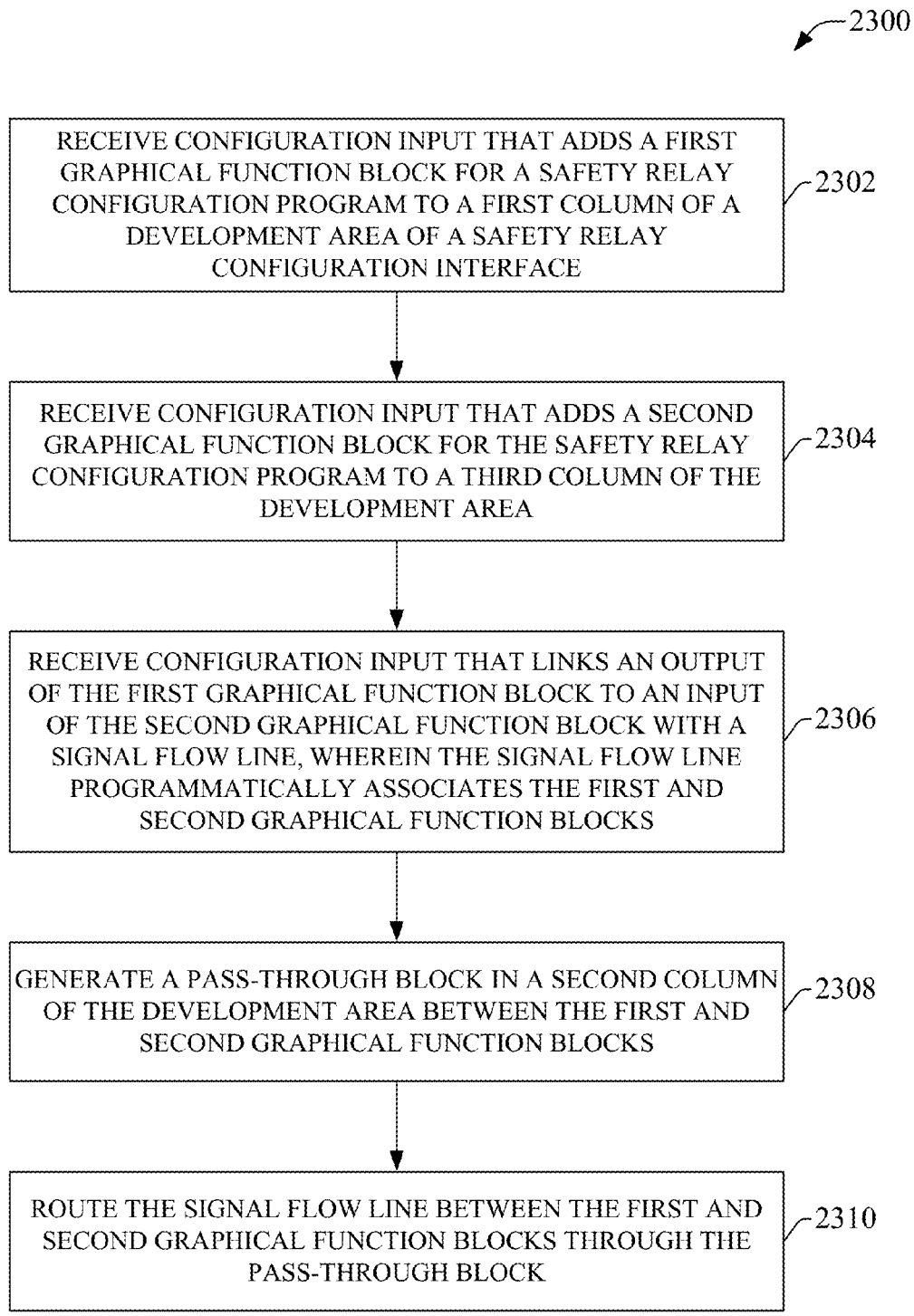
FIG. 23 is a flowchart of an example methodology for organizing signal flow lines between graphical function blocks of a safety relay configuration program on a development area of a safety relay configuration system interface.

FIGS. 22-23 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 22 illustrates an example methodology 2200 for organizing graphical function blocks of a safety relay program on a development area of a safety relay configuration system interface. Initially, at 2202, configuration input is received that adds graphical function blocks to a development area of a safety relay configuration interface. These can include, for example, safety monitoring function blocks, safety output function blocks, and logical operator function blocks. At 2204, the graphical function blocks are organized in the development area into four columns classified according to function block type. For example, the four columns can include a first column for safety monitoring function blocks, second and third columns for logical operator function blocks and pass-through function blocks, and a fourth column for safety output function blocks.

FIG. 23 illustrates an example methodology 2300 for organizing signal flow lines between graphical function blocks of a safety relay configuration program on a development area of a safety relay configuration system interface. Initially, at 2302, configuration input is received that adds a first graphical function block for a safety relay configuration program to a first column of a development area of a safety relay configuration interface (e.g., a safety monitoring column). At 2304, configuration input is received that adds a second graphical function block for the safety relay configuration program to a third column of the development area (e.g., a logic level column). At 2306, configuration input is received that links an output of the first graphical function block to an input of the second graphical function block with a signal flow line, wherein the signal flow line programmatically associates the first and second graphical function blocks.

At 2308, a pass-through block is generated in a second column of the development area between the first and second graphical function blocks. This pass-through block is added automatically by the configuration system when the configuration input instructing the signal flow line to be created between the first and second graphical function blocks is received at step 2306. At 2310, the signal flow line is routed between the first and second graphical function blocks through the pass-through block. The pass-through block performs no logical operation on the output of the first graphical function block prior to passing the output to the input of the second graphical function block, but instead is used only to organize signal flow lines between function blocks.

Embodiments, systems, and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 24:
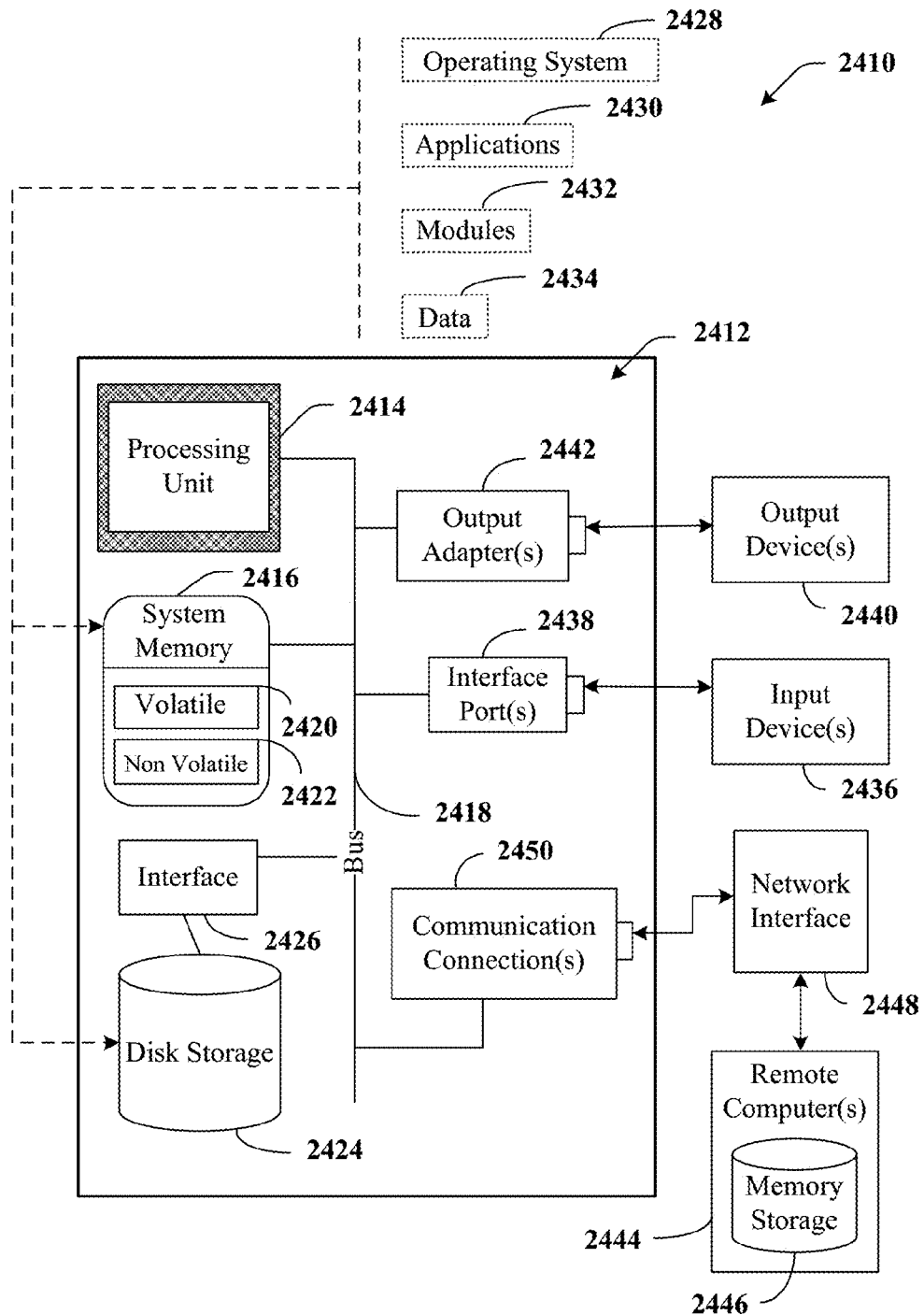
FIG. 24 is an example computing environment.
Figure 25:
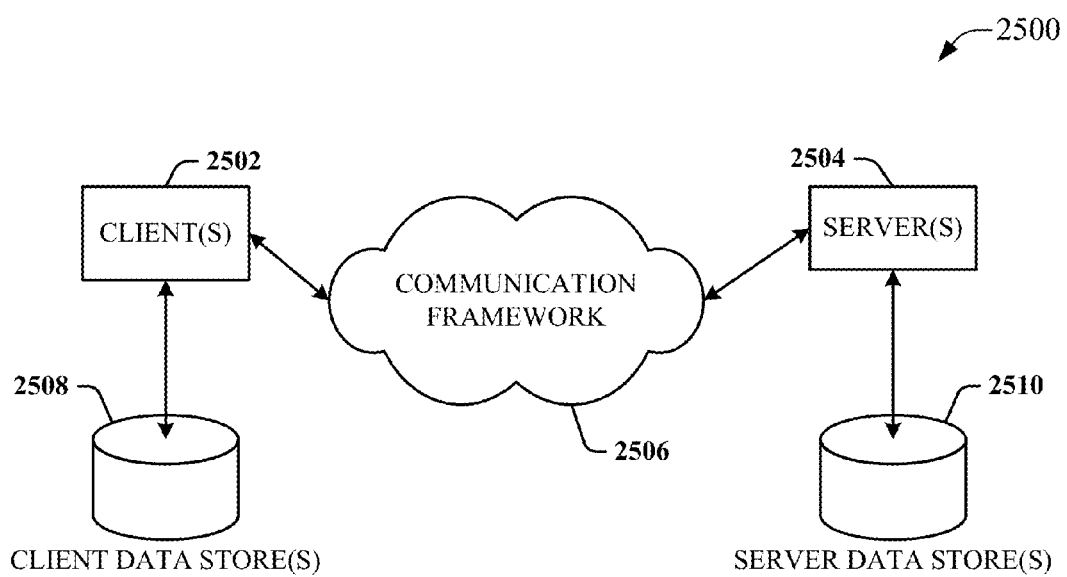
FIG. 25 is an example networking environment.

In order to provide a context for the various aspects of the disclosed subject matter, FIGS. 24 and 25 as well as the following discussion are intended to provide a brief, general description of a suitable environment in which the various aspects of the disclosed subject matter may be implemented.

With reference to FIG. 25, an example environment 2410 for implementing various aspects of the aforementioned subject matter includes a computer 2412. The computer 2412 includes a processing unit 2414, a system memory 2416, and a system bus 2418. The system bus 2418 couples system components including, but not limited to, the system memory 2416 to the processing unit 2414. The processing unit 2414 can be any of various available processors. Dual microprocessors and other multiprocessor architectures also can be employed as the processing unit 2414.

The system bus 2418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2416 includes volatile memory 2420 and nonvolatile memory 2422. The basic input/output system (BIOS), containing the basic routines to transfer information between elements within the computer 2412, such as during start-up, is stored in nonvolatile memory 2422. By way of illustration, and not limitation, nonvolatile memory 2422 can include read only memory (ROM), programmable ROM (PROM), electrically programmable ROM (EPROM), electrically erasable PROM (EEPROM), or flash memory. Volatile memory 2420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2412 also includes removable/non-removable, volatile/nonvolatile computer storage media. FIG. 22 illustrates, for example a disk storage 2424. Disk storage 2424 includes, but is not limited to, devices like a magnetic disk drive, floppy disk drive, tape drive, Jaz drive, Zip drive, LS-100 drive, flash memory card, or memory stick. In addition, disk storage 2424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2424 to the system bus 2418, a removable or non-removable interface is typically used such as interface 2426.

It is to be appreciated that FIG. 24 describes software that acts as an intermediary between users and the basic computer resources described in suitable operating environment 2410. Such software includes an operating system 2428. Operating system 2428, which can be stored on disk storage 2424, acts to control and allocate resources of the computer 2412. System applications 2430 take advantage of the management of resources by operating system 2428 through program modules 2432 and program data 2434 stored either in system memory 2416 or on disk storage 2424. It is to be appreciated that one or more embodiments of the subject disclosure can be implemented with various operating systems or combinations of operating systems.

A user enters commands or information into the computer 2412 through input device(s) 2436. Input devices 2436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2414 through the system bus 2418 via interface port(s) 2438. Interface port(s) 2438 include, for example, a serial port, a parallel port, a game port, and a universal serial bus (USB). Output device(s) 2440 use some of the same type of ports as input device(s) 2436. Thus, for example, a USB port may be used to provide input to computer 2412, and to output information from computer 2412 to an output device 2440. Output adapters 2442 are provided to illustrate that there are some output devices 2440 like monitors, speakers, and printers, among other output devices 2440, which require special adapters. The output adapters 2442 include, by way of illustration and not limitation, video and sound cards that provide a means of connection between the output device 2440 and the system bus 2418. It should be noted that other devices and/or systems of devices provide both input and output capabilities such as remote computer(s) 2444.

Computer 2412 can operate in a networked environment using logical connections to one or more remote computers, such as remote computer(s) 2444. The remote computer(s) 2444 can be a personal computer, a server, a router, a network PC, a workstation, a microprocessor based appliance, a peer device or other common network node and the like, and typically includes many or all of the elements described relative to computer 2412. For purposes of brevity, only a memory storage device 2446 is illustrated with remote computer(s) 2444. Remote computer(s) 2444 is logically connected to computer 2412 through a network interface 2448 and then physically connected via communication connection 2450. Network interface 2448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2450 refers to the hardware/software employed to connect the network interface 2448 to the system bus 2418. While communication connection 2450 is shown for illustrative clarity inside computer 2412, it can also be external to computer 2412. The hardware/software necessary for connection to the network interface 2448 includes, for exemplary purposes only, internal and external technologies such as, modems including regular telephone grade modems, cable modems and DSL modems, ISDN adapters, and Ethernet cards.

FIG. 25 is a schematic block diagram of a sample-computing environment 2500 with which the disclosed subject matter can interact. The sample-computing environment 2500 includes one or more client(s) 2502. The client(s) 2502 can be hardware and/or software (e.g., threads, processes, computing devices). The sample-computing environment 2500 also includes one or more server(s) 2504. The server(s) 2504 can also be hardware and/or software (e.g., threads, processes, computing devices). The servers 2504 can house threads to perform transformations by employing one or more embodiments as described herein, for example. One possible communication between a client 2502 and servers 2504 can be in the form of a data packet adapted to be transmitted between two or more computer processes. The sample-computing environment 2500 includes a communication framework 2506 that can be employed to facilitate communications between the client(s) 2502 and the server(s) 2504. The client(s) 2502 are operably connected to one or more client data store(s) 2508 that can be employed to store information local to the client(s) 2502. Similarly, the server(s) 2504 are operably connected to one or more server data store(s) 2510 that can be employed to store information local to the servers 2504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for programming an industrial safety relay, comprising:
   a memory that stores executable components; and
   a processor, operatively coupled to the memory, that executes the executable components, the executable components comprising:
      a configuration component configured to create a configuration program for a safety relay based on configuration input that manipulates graphical function blocks and signal flow lines between the graphical function blocks; and
      a graphical interface component configured to receive the configuration input and to display the graphical function blocks organized into columns of an editing area of a configuration interface, the columns comprising at least a safety monitoring column, a first logic column, a second logic column, and a safety output column
      wherein the graphical interface component is further configured to:
      in response to the configuration input instructing creation of a signal flow line between an output of a first graphical function block in the safety monitoring column and an input of a second graphical function block in one of the second logic column or the safety output column:
         insert a pass-through function block in the first logic column,
         connect the output of the first graphical function block to an input of the pass-through function block using a first signal flow line, and
         connect an output of the pass-through function block to the input of the second graphical function block using a second signal flow line, and
      in response to the configuration input instructing deletion of the first signal flow line, delete the first signal flow line and leave the second signal flow line connecting the output of the pass-through function block to the input of the second graphical function block unchanged.

2. The system of claim 1, wherein the safety monitoring column contains a first subset of the graphical function blocks corresponding to safety input devices, the first logic column contains a second subset of the graphical function blocks that define first logical operations, the second logic column contains a third subset of the graphical function blocks that define second logical operations, and the safety output column contains a fourth subset of the graphical function blocks corresponding to safety outputs of the safety relay.

3. The system of claim 1, wherein a spacing between adjacent columns of the columns is a fixed distance.

4. The system of claim 1, wherein the pass-through function block performs no logical operation on an output signal from the first graphical function block.

5. The system of claim 1, wherein the graphical interface component is further configured to organize the signal flow lines on the editing area according to defined line drawing rules.

6. The system of claim 5, wherein the defined line drawing rules include a rule specifying that vertical portions of two signal flow lines from respective two different function block outputs will not share a same vertical line location.

7. The system of claim 1, wherein the graphical interface component is further configured to programmatically associate an output of a first function block of the graphical function blocks with an input of a second function block of the graphical function blocks in response to a reference parameter located on the second function block being set to an identifier of the first function block.

8. The system of claim 1, wherein a width of the graphical function blocks within one of the columns is fixed for all rows of the graphical function blocks.

9. A non-transitory computer-readable medium having stored thereon instructions that, in response to execution, cause a system comprising a processor to perform operations, the operations comprising:
   displaying graphical function blocks on an editing area of a configuration interface, wherein the displaying comprises arranging the graphical function blocks into columns according to function block type, and wherein the columns comprise at least a safety monitoring column, a first logic column, a second logic column, and a safety output column;
   receiving configuration input via manipulation of one or more of the graphical function blocks and signal flow lines between the graphical function blocks;
   in response to receiving, as a first portion of the configuration input, an instruction to create a signal flow line between an output of a first graphical function block in the safety monitoring column and an input of a second graphical function block in one of the second logic column or the safety output column:
      creating a pass-through function block in the first logic column,
      connecting the output of the first graphical function block to an input of the pass-through function block using a first signal flow line, and
      connecting an output of the pass-through function block to the input of the second graphical function block using a second signal flow line;
   in response to receiving, as a second portion of the configuration input, an instruction to delete the first signal flow line, deleting the first signal flow line and leaving the second signal flow line connecting the output of the pass-through function block to the input of the second graphical function block intact; and generating a configuration program for a safety relay based on the configuration input.

10. The non-transitory computer-readable medium of claim 9, wherein the arranging comprises:
   placing a first subset of the graphical function blocks corresponding to safety input devices in the safety monitoring column;
   placing a second subset of the graphical function blocks that define first logical operations in the first logic column;
   placing a third subset of the graphical function blocks that define second logical operations in the second logic column; and
   placing a fourth subset of the graphical function blocks corresponding to safety outputs of the safety relay in the safety output column.

11. The non-transitory computer-readable medium of claim 9, wherein the arranging comprises spacing the columns according to a fixed distance.

12. The non-transitory computer-readable medium of claim 9, wherein the pass-through function block performs no operation on an output value of the first graphical function block.

13. The non-transitory computer-readable medium of claim 9, wherein the operations further comprise organizing the signal flow lines according to one or more defined line drawing rules, and wherein the defined line drawing rules comprise at least a rule specifying that vertical portions of two signal flow lines from respective two different function block outputs will not occupy a same vertical line location.

14. The non-transitory computer-readable medium of claim 9, wherein the operations further comprise programmatically linking an output of a first function block of the graphical function blocks with an input of a second function block of the graphical function blocks in response to setting a reference parameter located on the second function block to an identifier of the first function block.

15. The non-transitory computer-readable medium of claim 10, wherein the displaying comprises displaying the graphical function blocks to have a same width for all rows within one of the columns.

16. A method for constructing a program for an industrial safety relay, comprising:
   adding, by a system comprising at least one processor, graphical function blocks to an editing area of a configuration interface in response to first configuration input, wherein the adding comprises aligning the graphical function blocks into columns classified according to function block type, and the columns comprise at least a safety monitoring column, a first logic column, a second logic column, and a safety output column;
   adding, by the system, signal flow lines between at least a subset of the graphical function blocks in response to receipt of second configuration input, wherein the signal flow lines programmatically associate the subset of the graphical function blocks, wherein the adding comprises, in response to receiving, as a portion of the second configuration input, an instruction to create a signal flow line between an output of a first graphical function block in the safety monitoring column and an input of a second graphical function block in one of the second logic column or the safety output column:
      creating a pass-through function block in the first logic column,
      connecting the output of the first graphical function block to an input of the pass-through function block using a first signal flow line, and
      connecting an output of the pass-through function block to the input of the second graphical function block using a second signal flow line;
   in response to receiving, as another portion of the second configuration input, an instruction to delete the first signal flow line, deleting the first signal flow line and leaving the second signal flow line connecting the output of the pass-through function block to the input of the second graphical function block unchanged; and
   creating, by the system, a configuration program for a safety relay based on the graphical function blocks and the signal flow lines.

17. The method of claim 16, wherein the aligning comprises:
   locating a first subset of the graphical function blocks corresponding to safety input devices in the safety monitoring column;
   locating a second subset of the graphical function blocks that define first logical operations in the first logic column;
   locating a third subset of the graphical function blocks that define second logical operations in the second logic column; and
   placing a fourth subset of the graphical function blocks corresponding to safety outputs of the safety relay in the safety output column.

18. The method of claim 16, wherein the pass-through function block performs no operation on an output signal from the first graphical function block.

19. The system of claim 5, wherein the defined line drawing rules include a rule specifying that a first 90 degree break in a first signal flow line within a space between two of the columns is to occur at a first fraction of a distance between the two of the columns, and a second 90 degree break in a second signal flow line in the space between the two of the columns is to occur at a second fraction of the distance between the two of the columns.

20. The non-transitory computer-readable medium of claim 13, wherein the line drawing rules specify that a first 90 degree break in a first signal flow line within a space between two of the columns is to occur at a first fraction of a distance between the two of the columns, and a second 90 degree break in a second signal flow line in the space between the two of the columns is to occur at a second fraction of the distance between the two of the columns.

* * * * *